US008391513B2

(12) United States Patent
Ishikawa et al.

(10) Patent No.: US 8,391,513 B2
(45) Date of Patent: Mar. 5, 2013

(54) STREAM SYNTHESIZING DEVICE, DECODING UNIT AND METHOD

(75) Inventors: Tomokazu Ishikawa, Osaka (JP); Takeshi Norimatsu, Hyogo (JP); Takashi Katayama, Osaka (JP)

(73) Assignee: Panasonic Corporation, Osaka (JP)

( * ) Notice: Subject to any disclaimer, the term of this patent is extended or adjusted under 35 U.S.C. 154(b) by 923 days.

(21) Appl. No.: 12/519,248

(22) PCT Filed: Oct. 16, 2008

(86) PCT No.: PCT/JP2008/002941
§ 371 (c)(1),
(2), (4) Date: Jun. 15, 2009

(87) PCT Pub. No.: WO2009/050896
PCT Pub. Date: Apr. 23, 2009

(65) Prior Publication Data
US 2010/0063828 A1 Mar. 11, 2010

(30) Foreign Application Priority Data
Oct. 16, 2007 (JP) ................................. 2007-269127
Jul. 16, 2008 (JP) ................................. 2008-184666

(51) Int. Cl.
*H03G 5/00* (2006.01)
(52) U.S. Cl. ............ 381/110; 381/23; 381/119; 381/20; 381/18; 704/500; 704/501; 700/94
(58) Field of Classification Search ................... 381/310, 381/119, 20, 18, 23; 704/501, 500, 502–504, 704/201, 263, 266; 375/316; 700/94
See application file for complete search history.

(56) References Cited

U.S. PATENT DOCUMENTS

| | | | |
|---|---|---|---|
| 5,657,350 A | 8/1997 | Hofmann | |
| 5,751,902 A | 5/1998 | Hofmann | |
| 7,292,901 B2 * | 11/2007 | Baumgarte et al. | 700/94 |
| 7,716,043 B2 * | 5/2010 | Pang et al. | 704/201 |
| 7,742,913 B2 * | 6/2010 | Pang et al. | 704/201 |
| 7,761,303 B2 * | 7/2010 | Pang et al. | 704/500 |
| 7,761,304 B2 * | 7/2010 | Faller | 704/502 |
| 7,831,435 B2 * | 11/2010 | Pang et al. | 704/500 |
| 7,986,789 B2 * | 7/2011 | Purnhagen et al. | 381/23 |
| 8,223,976 B2 * | 7/2012 | Purnhagen et al. | 381/23 |
| 2005/0058304 A1 | 3/2005 | Baumgarte et al. | |
| 2005/0074127 A1 * | 4/2005 | Herre et al. | 381/20 |
| 2005/0180579 A1 | 8/2005 | Baumgarte et al. | |
| 2005/0216262 A1 * | 9/2005 | Fejzo | 704/217 |
| 2005/0226426 A1 | 10/2005 | Oomen et al. | |
| 2006/0233379 A1 | 10/2006 | Villemoes et al. | |
| 2006/0233380 A1 * | 10/2006 | Holzer et al. | 381/23 |
| 2007/0160236 A1 * | 7/2007 | Iida et al. | 381/119 |
| 2007/0244706 A1 | 10/2007 | Tsushima | |
| 2007/0258607 A1 * | 11/2007 | Purnhagen et al. | 381/307 |
| 2007/0269063 A1 * | 11/2007 | Goodwin et al. | 381/310 |
| 2007/0291951 A1 * | 12/2007 | Faller | 381/22 |
| 2008/0008323 A1 | 1/2008 | Hilpert et al. | |
| 2008/0091439 A1 | 4/2008 | Baumgarte et al. | |
| 2009/0043591 A1 * | 2/2009 | Breebaart et al. | 704/500 |
| 2010/0014692 A1 * | 1/2010 | Schreiner et al. | 381/119 |

FOREIGN PATENT DOCUMENTS

CN 1669359 9/2005
JP 2005-229259 8/2005
(Continued)

OTHER PUBLICATIONS

International Search Report issued Dec. 16, 2008 in the International (PCT) Application of which the present application is the U.S. National Stage.

(Continued)

*Primary Examiner* — Vijay B Chawan
(74) *Attorney, Agent, or Firm* — Wenderoth, Lind & Ponack, L.L.P.

(57) ABSTRACT

To provide an enhanced true-to-life atmosphere enjoyed in multipoint connecting, and reduce a calculation load at a multipoint connection unit, as well.

A stream synthesizing device includes an input unit which inputs at least two coded signals each including a first downmix acoustic signal and an extended signal, each of first downmix acoustic signals being obtained by coding an acoustic signal into which at least two sound signals are downmixed, and the extended signal being for obtaining the at least two sound signals out of the first downmix acoustic signal; a coded signal generating unit which generates: a second downmix acoustic signal and an extended signal based on each of coded signals inputted by the input unit, the second downmix acoustic signal being for obtaining each of the first downmix acoustic signals, and the generated extended signal being for obtaining each of the first downmix acoustic signals out of the second downmix acoustic signal; and generate a coded signal including the generated second downmix acoustic signal, the generated extended signal, and each of extended signals included in the corresponding inputted coded signal; and an output unit which outputs the generated coded signal.

16 Claims, 21 Drawing Sheets

FOREIGN PATENT DOCUMENTS

| | | |
|---|---|---|
| JP | 2005-229612 | 8/2005 |
| JP | 2005-523479 | 8/2005 |
| JP | 2006-067367 | 3/2006 |
| JP | 2006-323314 | 11/2006 |
| JP | 2009-543142 | 12/2009 |
| RU | 2 123 728 | 12/1998 |
| WO | 94/25960 | 11/1994 |
| WO | 94/25961 | 11/1994 |
| WO | 03/090207 | 10/2003 |
| WO | 2004/008805 | 1/2004 |
| WO | 2005/112002 | 11/2005 |
| WO | 2006/108462 | 10/2006 |
| WO | 1 758 100 | 2/2007 |
| WO | 2007/058510 | 5/2007 |
| WO | 2007/114594 | 10/2007 |

OTHER PUBLICATIONS

"Digital Signal Processing," from URL:http://winnie.kuis.kyoto-u.ac.jp/~ogata/le4-pr/node2.html searched on the Internet on Jul. 15, 2007, pp. 1 and 2 (with full English translation).

Akio Jin et al., "Scalable Audio Coding Based on Hierarchical Transform Coding Modules", IEICE The Transactions of the Institute of Electronics, Information and Communication Engineers A, vol. J83-A, No. 3, Mar. 2003, pp. 241-252 (with full English translation).

From URL:http://www.murata.elec.waseda.ac.jp/~mura/Research/ICA/ieice99/mld.m searched on the Internet on Jul. 15, 20007.

ISO/IEC FDIS 23003-1:2006(E), "Information technology—MPEG audio technologies—, Part 1: MPEG Surround".

Sadaoki Furui, "Digital Audio Processing", Tokai daigaku Syuppann-kai, Sep. 1985, pp. 60-65, 72-79 (with partial English translation).

Extended European Search Report issued Sep. 30, 2011 in corresponding European Application No. 08839632.0.

Breebaart, J. et al., "MPEG Spatial Audio Coding/MPEG Surround: Overview and Current Status", Audio Engineering Society Convention Paper, New York, NY, US, Oct. 7, 2005, pp. 1-17, XP002364486.

"Concepts of Object-Oriented Spatial Audio Coding", 1. AVC Meeting; Nov. 13-16, 1990; The Hague; (CCITTSGXVEXPERT Group for ATM Video Coding), No. N8329, Jul. 21, 2006, XP030014821.

Official Decision of Grant issued on Jul. 19, 2012 for the corresponding Russian patent application No. 2009122690 and its English translation.

\* cited by examiner

STREAM SYNTHESIZING DEVICE, DECODING UNIT AND METHOD

TECHNICAL FIELD

The present invention relates to multipoint teleconferencing systems utilizing an audio codec technique to establish communications and in particular, to a multipoint connection unit.

BACKGROUND ART

Recent years have seen an introduction of teleconferencing systems to establish connections between plural points via the IP (Internet Protocol). A conventional conference system uses a speech coding technique including G. 726 to establish connections between each of points on one-to-one basis.

Providing a monophonic acoustic signal based on a monophonic speech coding technique including the G. 726 described in Non-Patent Reference 1 is short of rendering a true-to-life atmosphere at each of the points. Thus, it is difficult for the listeners to specify a speaker when several people simultaneously speak at each of the points. This results from deterioration of sound separation performance.

Thus, introduction of a multi-channel coding technique, such as the MPEG-AAC technique described in Non-Patent Reference 2, can improve the separation performance. Though providing a true-to-life atmosphere at each of the points, the MPEG-AAC technique overloads the network due to increasing transmission quantity (bit rate). Compared with a speech coding technique, a typical multi-channel coding technique suffers an approximately 100-time increase in bit rate.

Instead of the MPEG-AAC technique, the MPEG-Surround technique described in Non-Patent Reference 3 utilizes a low bit-rate multi-channel coding technique to prevent an increase in bit rate.

Non-Patent Reference 1: ITU-T G.726 standard
Non-Patent Reference 2: MPEG-AAC standard ISO/IEC 13818-3
Non-Patent Reference 3: MPEG-Surround standard ISO/IEC 23003-3
Non-Patent Reference 4: <URL:http://winnie.kuis.kyoto-u.ac.jp/~ogata/le4-pr/node2.html> searched on the Internet on Jul. 15, 2007
Non-Patent Reference 5: 2000. vol. J83-A. "Scalable Audio Coding Based on Hierarchical Transform Coding Modules." IEICE The Transactions of the Institute of Electronics, Information and Communication Engineers. A. no. 3 (20000325), pp. 241-252.
Non-Patent Reference 6: <URL:http://www.murata.elec.waseda.ac.jp/~mura/Research/ICA/ieice99/mld.m> searched on the Internet on Jul. 15, 2007

SUMMARY OF THE INVENTION

Problems that Invention is to Solve

The MPEG-Surround technique has considerable problems in using as a teleconference system.

As shown in FIGS. 1 and 2, the mesh network and (FIG. 1) and the star network (FIG. 2) are utilized to establish a network in a teleconference system. When several points are connected in the mesh network (FIG. 1), increasing connected points mean a significant amount of simultaneous coding processing on a transmission-reception terminal apparatus at each of the points. When there are n points, the terminal at each point needs to perform n times of decoding processing. In the case of coding and decoding on a multi-channel coding technique, such as the MPEG-Surround technique, a significant amount of calculation is required. Thus, executing the simultaneous and plural times of decoding processing as described above requires a high calculation performance for a coding and decoding processor; namely, a considerably large-scale processor. Unfortunately, a typical processing processor for simultaneous decoding processing as described above tends to be expensive and suffer a high cost. Further, designing an arithmetic memory having reserve capacity leads to a further increase in the high cost. This problem is fatal to a portable terminal since the portable terminal should conserve electricity.

Meanwhile, the star network (FIG. 2) establishing a connection via a multipoint connection unit (MCU) 403 also has a problem. A transmission-reception terminal apparatus at each of points merely executes the transmission-reception processing between the MCU and the apparatus alone, which dispenses with excessive processing capability or an arithmetic memory. The multipoint connection unit (MCU), however, is required to have a significant calculation performance. FIG. 3 illustrates three points establishing connections via a multipoint connection unit 403 and communications each other thorough a conventional multi-channel coding technique, such as the MPEG-Surround. FIG. 3 exemplifies each point conducting three-channel communications. The multipoint connection unit 403: executes multi-channel decoding on coded information 401 and coded information 402 received from points 1 and 2, respectively; downmixes each of channels; and provide, to transmit to a point 3, three-channel coding again on the downmixed channels. In other words, when n points are connected to the multipoint connection unit (MCU), the multipoint connection unit needs to simultaneously execute n times of coding processing and n times of decoding processing in order to once decode coded streams each received from the associated point, and synthesize the coded streams into one signal. Accordingly, the problem arose at the transmission-reception terminal apparatus in the mesh network also arises at the multipoint connection unit.

The present invention is conceived in view of the above-described conventional problems.

Means to Solve the Problems

In order to solve the above problems, a first stream synthesizing device in the present invention includes an input unit which inputs at least two coded signals each including a first downmix acoustic signal and an extended signal, each of first downmix acoustic signals being obtained by coding an acoustic signal into which at least two sound signals are downmixed, and the extended signal being for obtaining the at least two sound signals out of the first downmix acoustic signal; a coded signal generating unit which generates: a second downmix acoustic signal and an extended signal based on each of coded signals inputted by the input unit, the second downmix acoustic signal being for obtaining each of the first downmix acoustic signals, and the generated extended signal being for obtaining each of the first downmix acoustic signals out of the second downmix acoustic signal; and generate a coded signal including the generated second downmix acoustic signal, the generated extended signal, and each of extended signals included in the corresponding inputted coded signal; and an output unit which outputs the generated coded signal.

A decoding device includes an input unit which inputs a coded signal including a downmix acoustic signal and an extended signal, the downmix acoustic signal being provided out of a coded acoustic signal into which at least two sound signals are downmixed, and the extended signal being for obtaining the at least two sound signals out of the downmix acoustic signal, wherein the downmix acoustic signal in the coded signal to be inputted is a second downmix acoustic signal for obtaining each of downmix acoustic signals in predetermined at least two coded signals, the extended signal in the coded signal to be inputted is an extended signal for obtaining each of the first downmix acoustic signals out of the second downmix acoustic signal, and the decoding unit includes a decoding sub-unit which generates at least two intermediate signals based at least on a interaural correlation coefficient (ICC) and a frequency interaural level difference (ILD) included in the extended signal, and to multiply the generated at least two intermediate signals by the frequency interaural level difference (ILD), the at least two intermediate signals being uncorrelated out of a decoded signal obtained from the second downmix acoustic signal with a use of the interaural correlation coefficient (ICC). It is noted that the decoding unit generates each of the intermediate signals based on at least the interaural correlation coefficient (ICC) and the frequency interaural level difference (ILD). The decoding unit may generate each of the intermediate signals based on another piece of data than the interaural correlation coefficient (ICC), the frequency interaural level difference (ILD), or both of the interaural correlation coefficient (ICC) and the frequency interaural level difference (ILD).

A second stream synthesizing unit uses a coded signal as an input and output signal thereof, the coded signal which includes: a downmix acoustic signal provided out of a coded acoustic signal into which no less than one monophonic signal is downmixed; and an extended signal for decoding the downmix acoustic signal into no less than one monophonic signal. The second stream synthesizing unit is featured to receive no less than two coded signals to shape: downmix acoustic signal portion in the no less than one coded signal into one downmix acoustic signal; and the downmix acoustic signal into an extended signal for decoding no less than one monophonic signal.

A third stream synthesizing unit uses a coded signal as an input and output signal thereof, the coded signal which includes: a downmix acoustic signal provided out of a coded acoustic signal into which no less than one monophonic signal is downmixed; and an extended signal for decoding the downmix acoustic signal into no less than one monophonic signal. The third stream synthesizing unit is featured to: receive no less than two of coded signals including the coded signal, and transmit one of the coded signals; and synthesize extended signals, having the extended signal, included in the received coded signals into one coded signal.

A fourth stream synthesizing unit uses a coded signal as an input and output signal thereof, the coded signal which includes: a downmix acoustic signal provided out of a coded acoustic signal into which no less than one monophonic signal is downmixed; and an extended signal for decoding the downmix acoustic signal into no less than one monophonic signal. The fourth stream synthesizing unit is featured to synthesize into a signal including information indicating transmission sources of the no less than two of coded signals.

A first decoding unit receives a coded signal as an input thereof, the coded signal which includes: a downmix acoustic signal provided out of a coded acoustic signal into which no less than one monophonic signal is downmixed; and an extended signal for decoding the downmix acoustic signal into no less than one monophonic signal. The first decoding unit receives a signal shaped into an extended signal for decoding, out of the no less than two coded signals, downmix acoustic signal portion in the no less than one coded signal into one downmix signal and the downmix acoustic signal into no less than one monophonic signal. The extended signal includes a frequency power ratio (ILD) of no less than one monophonic signal and a interaural correlation coefficient (ICC) of no less than one monophonic signal. The first decoding unit uncorrelates a signal with the downmixed acoustic signal decoded, using the interaural correlation coefficients (ICC), and generates no less than two intermediate signals. Then, the first decoding unit multiplies the no less than two intermediate signals with the frequency power ratio (ILD).

A second decoding unit receives a coded signal as an input thereof, the coded signal which includes: a downmix acoustic signal provided out of a coded acoustic signal into which no less than one monophonic signal is downmixed; and an extended signal for decoding the downmix acoustic signal into no less than one monophonic signal. The second decoding unit receives a signal shaped into an extended signal for decoding, out of the no less than two coded signals, downmix acoustic signal portion in the no less than one coded signal into one downmix signal and the downmix acoustic signal into no less than one monophonic signal. The extended signal includes the ratio of the power between the powers of the frequency and a squared monophonic signal of no less than one monophonic signal. The second decoding unit is featured to suspend decoding when the ratio of the power between the powers of the frequency and a squared monophonic signal is greater than a predetermined threshold.

A fifth stream synthesizing unit uses a coded signal as an input and output signal thereof, the coded signal which includes: a downmix acoustic signal provided out of a coded acoustic signal into which no less than one monophonic signal is downmixed; and an extended signal for decoding the downmix acoustic signal into no less than one monophonic signal. The fifth stream synthesizing unit is featured to receive no less than two coded signals to shape: downmix acoustic signal portion in the no less than one coded signal into one downmix acoustic signal; and the downmix acoustic signal into an extended signal for decoding no less than one monophonic signal When using a monophonic speech coding technique including the G. 726, the fifth stream synthesizing unit can provide a solution to the problems that sound separation performance deteriorates due to monophonic acoustic signals when several people simultaneously speak at each of the point, and thus it is difficult for the listeners to specify a speaker.

Effects of the Invention

The above described stream synthesizing unit can provide an enhanced true-to-life atmosphere enjoyed in multipoint connecting, and reduce a calculation load at a multipoint connection unit, as well.

NUMERICAL REFERENCES

Figure 1:
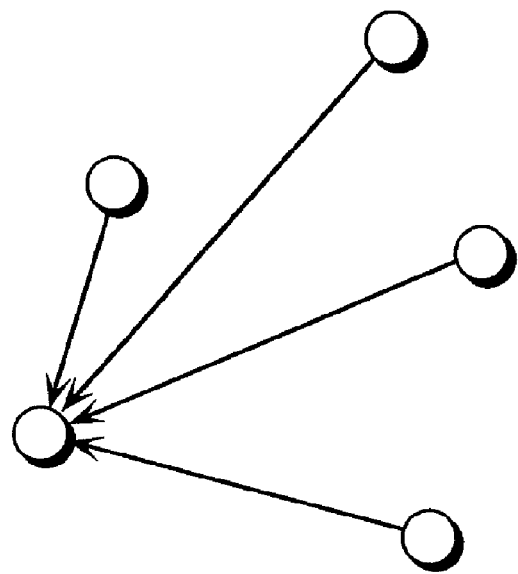
FIG. 1 illustrates a type of communications path.

100 Stream synthesizing device
101, 102, and 107 Coded information
103 Separating circuit
104 Downmix shaping circuit
105 Extended information calculating circuit
106 Multiplexing circuit
201 and 204 Downmix coded signal
202, 203, 205, and 206 Extended information
207 Downmix coded signal
208 Downmix separating information
401, 402, and 407 Coded information
501 and 502 Decoding circuit
503 Downmix circuit
504 Decoding circuit
601 Downmix coded signal
602 Extended information
603 and 604 Separating circuit
701 Input signal
702 Separating information (correlation value)
703 Separating information (Interaural level difference)
704 Uncorrelating circuit
705 and 706 Gain controlling circuit
707 Separated first signal
708 Separated second signal
801 Downmix coded signal of a point 1
802 and 803 Extended information of the point 1
804 Downmix coded signal of a point 2
805, 806, and 807 Extended information of the point 2
808 Downmix coded signal of a point 3
809 Downmix separating information of the point 3
901 Tree information
902 Downmix coded signal of the point 3
903 Downmix separating information of the point 3
904, 905, and 906 Extended information
907 Determining information
908 Point information
909 The number of signals
910 Depth-of-tree information
911 Tree coefficient of a signal 1
912 Tree coefficient of a signal 2
913 Tree coefficient of a signal 3
914 End information
1001 Inverse quantizing unit
1101 Downmix signal
1102, 1103, 1104 Extended information
1105 Downmix signal
1106, 1107, 1108, and 1109 Extended information
1110 Downmix signal
1111 Downmix separating information
1112 and 1113 Extended information
1114, 1115, and 1116 Coded information
1301 The number of input signals
1401 Priority information
1402 Extended signal of input signal 1 of the point 1 (Maximum priority)
1403 Extended signal of input signal 2 of the point 2 (Minimum priority)

DETAILED DESCRIPTION OF THE INVENTION

Hereinafter, embodiments of the present invention shall be described with reference to the drawings.

First Embodiment

Figure 4:
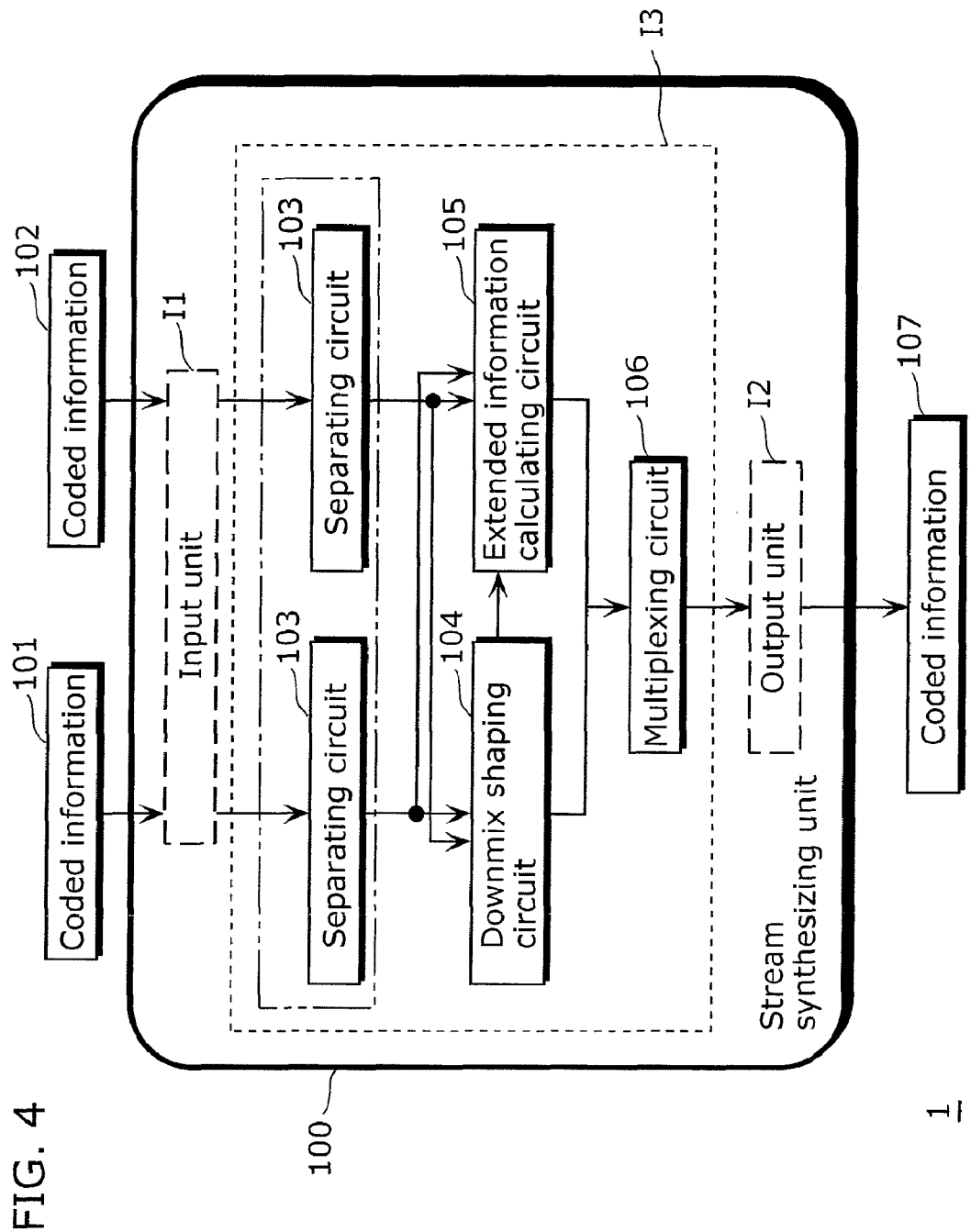
FIG. 4 illustrates a stream synthesizing unit in a first embodiment of the present invention.
Figure 5:
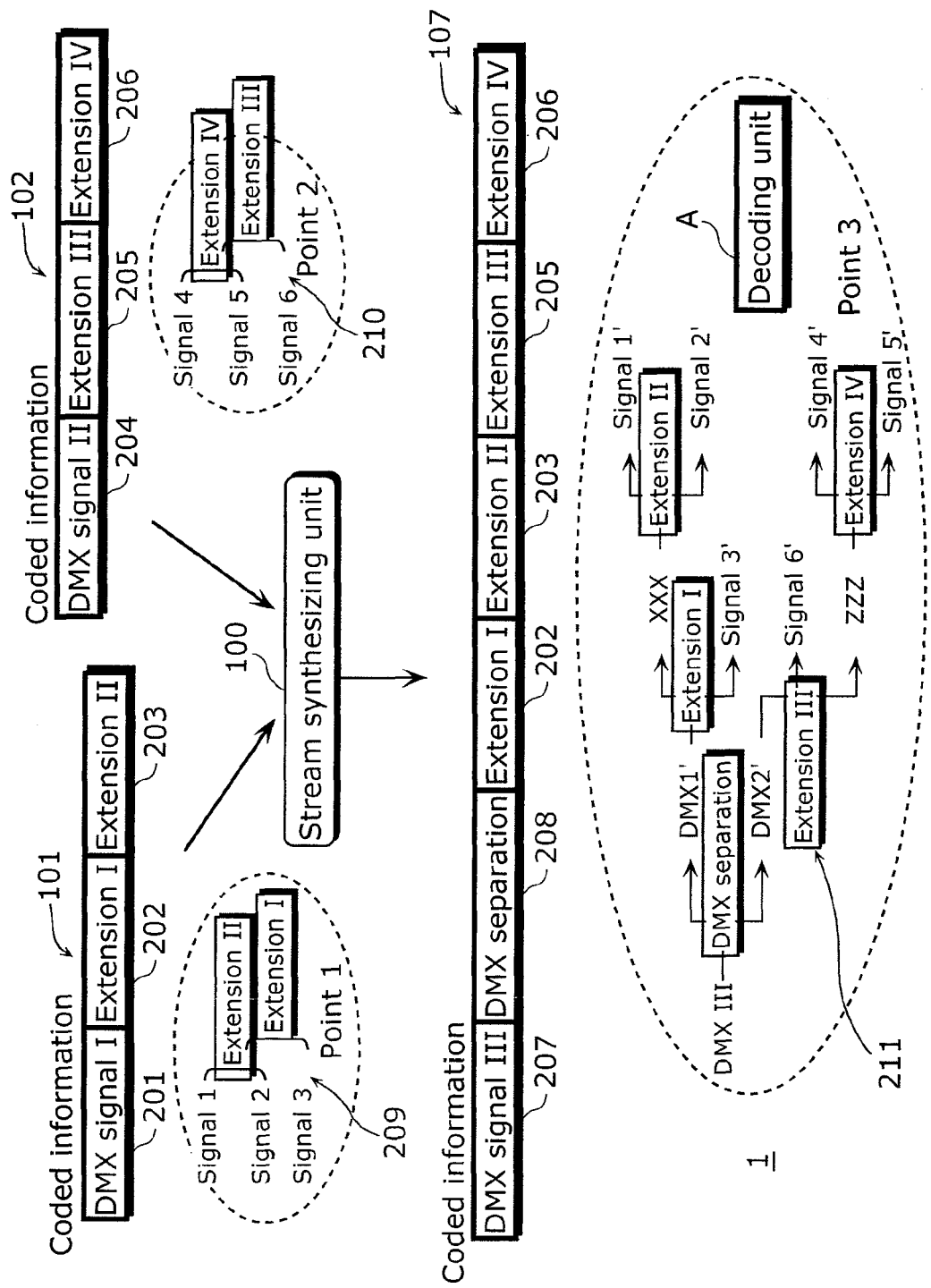
FIG. 5 exemplifies a multipoint connection in the first embodiment of the present invention.

FIG. 4 is a structural diagram of a stream synthesizing unit 100 in the present invention. Further, FIG. 5 illustrates points 1, 2, and 3 establishing connections each other via the stream synthesizing unit (multipoint connection unit) 100 in the present invention. Hereinafter, the multipoint teleconferencing system including the points 1 to 3 and the stream synthesizing unit 100 is referred to as a system 1 (FIG. 5). First, FIG. 5 shows an overview of the system 1.

FIG. 5 is a block diagram of the system 1.

Each of points picks up two or more independent acoustic signals on a microphone to obtain a multi-channel PCM (Pulse Code Modulation) signal. In FIG. 5, the point 1 picks up signals 1 to 3, and the point 2 picks up signals 4 to 6. Expression 1 provides a stereophonic or monophonic downmix PCM signal out of the obtained PCM signal.

$$DMX(n)=\Sigma a(i,n)*\text{Input}(i) \quad n=1 \text{ or } 2 \quad \text{(Expression 1)}$$

where a (i, n) is a downmix coefficient of each of input signals. When five signals are picked up, the downmix coefficient disclosed in the ITU-R BS. 775-1 standard is utilized. It is noted that "Σ" represents the total sum of sequence. In other words, "Σ" means the "Σ" in mathematics.

Here, plural independent acoustic signals serve as a regular multi-channel signal.

Then, the monophonic or stereophonic downmix signal calculated as described above receives monophonic or stereophonic acoustic coding processing, respectively. The stereophonic downmix signal receives the acoustic coding processing by the MPEG AAC technique described in Non-Patent Reference 2. The monophonic downmix signal receives the acoustic coding processing by the G. 726 technique and the monophonic coding in the MPEG-AAC described in Non-Patent Reference 1. It is noted that a technique for coding a downmix signal is not limited to the MPEG-AAC and the G. 726. Instead, the Dolby Digital (AC-3), the MPEG-Layer 3 technique, and the TwinVQ technique may also be utilized.

FIG. 5 shows signals provided by coding the downmix PCM signals as a DMX signal 201 and a DMX signal 204. These are generically referred to as downmix coded signals.

As a matter of convenience, this application refers to an entire processing as downmix coding, the entire processing which involves downmixing plural original signals such as plural acoustic signals and coding the downmixed downmix PCM signals into a DMX signal. Here, downmix coding is simply referred to as "coding" as needed. To the contrary, processing to generate the plural original signals out of the DMX signals is referred to as downmix decoding. Here, downmix decoding is simply referred to as "decoding" as needed.

Next, a signal referred to as an extended signal is determined. This signal includes information for decoding the downmix signals (such as the DMX signal 201 and the DMX signal 204) in plural independent signals. The point 1 exemplifies the calculation of the extended signal. First, an interaural level difference (ILD) and a interaural correlation coefficient (ICC) are derived from between input signals (in the case where a signal 1 and signal 2 are both monophonic signals) on a frame basis as follows:

$$\text{Gain}(n)=10*\log(\text{Input1}(n)/\text{Input2}(n)). \quad \text{(Expression 2)}$$

$$\text{Cor}(n)=\Sigma(\text{Input1}(n)*\text{Input2}(n)/\text{Input2}(i)\hat{\ }2) \quad \text{(Expression 3)}$$

where the signal 1 is Input1($n$) and the signal 2 is Input2($n$),Input2($n$).

It is noted that the symbol "^" denotes an exponential calculation in this application. Specifically, "A^B" including the symbol "^" denotes A to the Bth power.

The interaural level difference (ILD) and the interaural correlation coefficient (ICC) are quantized and Huffman-coded to generate extended information 203. The OTT circuit (a circuit generating the above extended signal out of two inputs) used for the MPEG-Surround coding described in Non-Patent Reference 3 shall provide a detailed process of the calculation. It is noted that the interaural level difference (ILD) and the interaural correlation coefficient (ICC) are exemplified as extended information; however, the extended information shall not be limited to these. Further, the above calculation has exemplified to generate the extended information out of two independent signals. Meanwhile, another technique may be utilized in obtaining the extended information out of three signals. The TTT circuit used for the MPEG-Surround coding described in Non-Patent Reference 3 shall provide the details of the technique. In the case of four or more independent signals, serially connected OTT circuits, each of which is a signal apparatus receiving two inputs, calculates the extended signal. For example, two OTT circuits are used to receive four independent signals and generate two pairs of the downmix signals in order to obtain one downmix signal via an OTT circuit. In other words, three OTT circuits are used.

It is noted that the extended information may include phase difference information (IPD), as well as the interaural level difference (ILD) and the interaural correlation coefficient (ICC).

Next, the signals 1 and 2 are downmixed to be converted into the monophonic signal. The interaural level difference (ILD) and the interaural correlation coefficient (ICC) are calculated, using Expressions 2 and 3, out of the monophonic signal and the signal 3, and quantized and Huffman-coded to create extended information 202. Coded information 101 includes the downmix coded signal 201, extended information 202, and extended information 203. Here, the extended information 202 separates the signal 3 and a synthesized signal including the signals 1 and 2 from the downmix coded signal 201. The extended information 203 separates the synthesized signal, including the signals 1 and 2 and separated by the extended information 202, into the signal 1 and the signal 2. A signal tree 209 in FIG. 5 schematically illustrates the above.

Similar to the point 1, the point 2 calculates extended information 206 out of the signals 4 and 5, and extended information 205 out of signal 6 and a synthesized signal with the signals 4 and 5 downmixed.

The downmix coded signals and the pieces of extended information through the above are synthesized on a point basis, and provided to the stream synthesizing unit 100 via a communications path including the Internet.

FIG. 4 illustrates the stream synthesizing unit 100 of the present invention in detail. The stream synthesizing unit 100 executes the following calculation.

First, a separating circuit 103 separates the downmix coded signals and the pieces of extended information from the coded information 101 at the point 1 and the coded information 102 at the point 2, respectively. In the separation, a piece of information to distinguish between the downmix signals and the pieces of extended information is assigned to each starting point of the piece of extended information. The separating circuit 103 executes the above separation in accordance with the piece of information.

Figure 6:
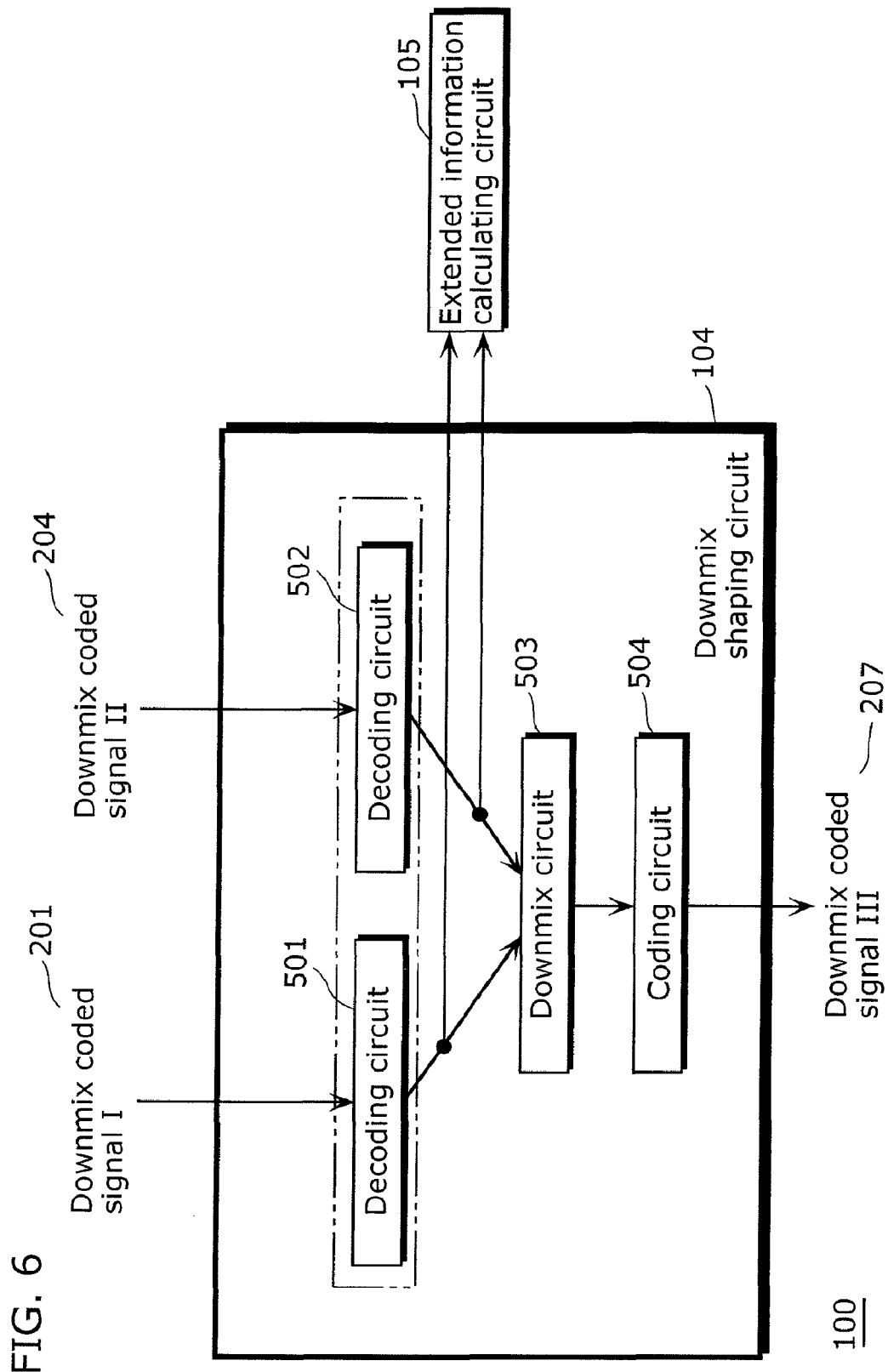
FIG. 6 shows a downmix shaping circuit in the first embodiment of the present invention.

FIG. 6 illustrates a structure of a downmix shaping circuit 104 (FIG. 4).

In the downmix shaping circuit 104, the separated downmix coded signals are temporarily decoded into the PCM signals by the decoding circuits 501 and 502 included in the downmix shaping circuit 104, following a predetermined process. It is noted that when the downmix coded signals are coded by the MPEG-AAC technique, the decoding technique described in Non-Patent Reference 2 is adopted to decode the downmix signals in order to obtain the PCM signals. The PCM signals obtained through the above are referred to as a PCM 1 and a PCM 2.

The downmix shaping circuit 104 obtains a downmix coded signal 207 (FIG. 6) by further: downmixing the decoded PCM signals (PCMS 1 and 2) on a downmixing circuit 503; and coding the downmixed decoded PCM signals on a coding circuit 504 in accordance with a predetermined coding technique (the MPEG-AAC technique, for example). Expression 4 exemplifies a downmixing process described above:

$$DMX=0.5*PCM1+0.5*PCM2 \quad \text{(Expression 4)}$$

It is noted here that the coefficient represents 0.5. Meanwhile, the coefficient is not limited to this as far as the following relationship holds:

$$a(i)+b(i)=1 \quad \text{(Expression 5)}$$

where coefficients for the PCMS 1 and 2 are a(i) and b(i), respectively. This process is equivalent to an operation of the downmixing circuit 503 in FIG. 6.

Then, an extended information calculating circuit 105 (FIG. 4) calculates extended information out of the PCM 1 and PCM 2 in accordance with the above described Expressions 2 and 3. The calculated extended information is referred to as downmix separating information (downmix extended information) 208 (DMX separation in FIG. 5).

The downmix separating information is calculated as follows.

Figure 16:
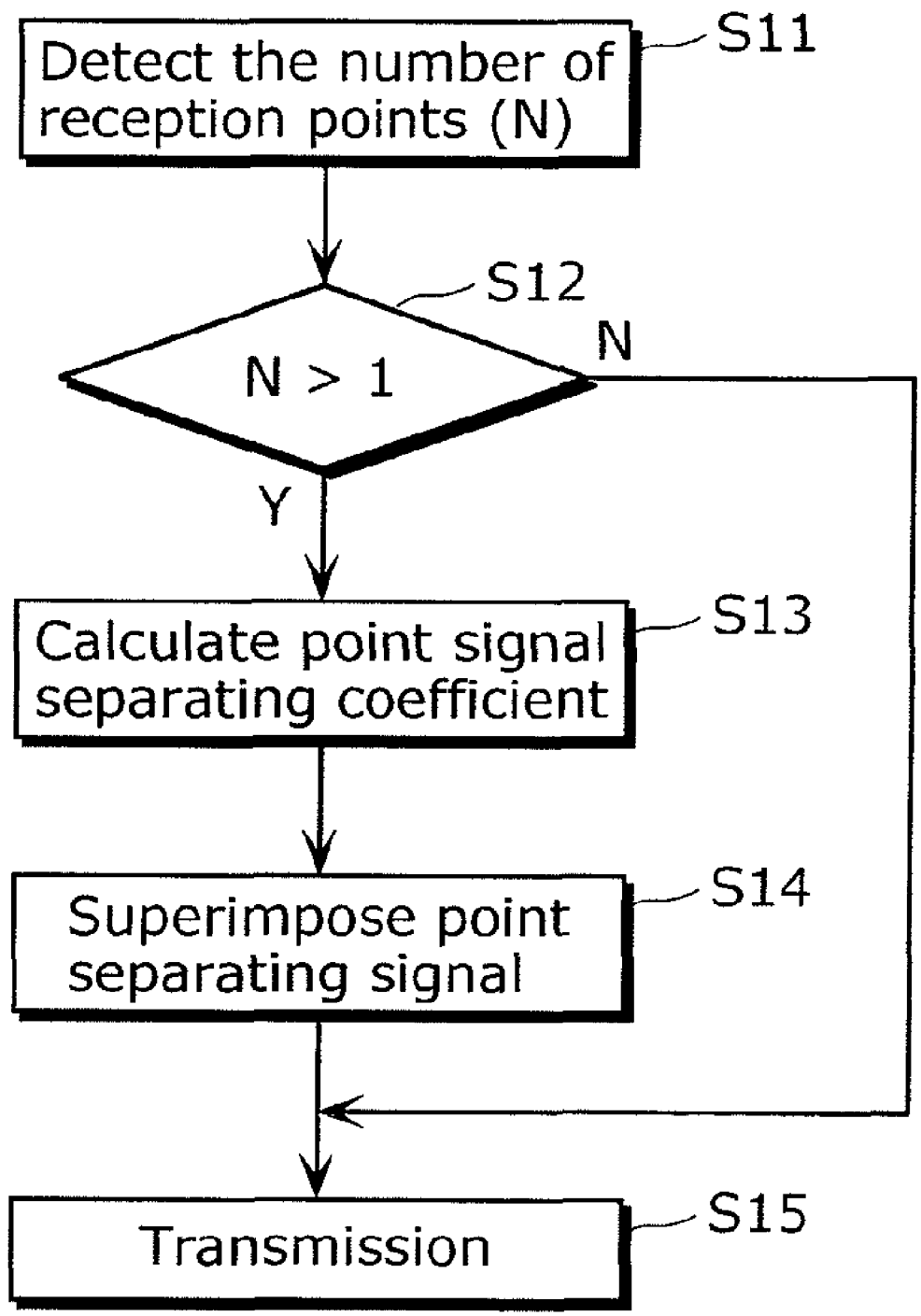
FIG. 16 is a flowchart to show how the stream synthesizing unit detects the number of reception points.

FIG. 16 is a flowchart in determining whether or not the downmix separating information should be obtained.

The establishment of the points in the embodiment exemplifies the stream synthesizing unit 100 receiving signals from two points and transmitting a synthesized signal to a point. Here, the number of reception points n is "2". The stream synthesizing unit 100 detects the number of reception points (Step S11). Since the detected number of reception points is greater than 1 (Step S12:Y), the stream synthesizing unit 100 causes the extended information calculating circuit 105 to calculate a point signal separating coefficient (downmix separating information) (Step S13). The calculation shall be described hereinafter. Upon calculating the point signal separating coefficient, a multiplexing circuit 106 synthesizes the coefficient and the original extended information into one stream (Step S14), and an output unit I2 outputs the stream to the third point (Step S15). As described above, Step S14 involves the multiplexing circuit 106 superimposing the point signal separating coefficient. A calculation process of the point signal separating coefficient shall be described in FIG. 18.

Figure 18:
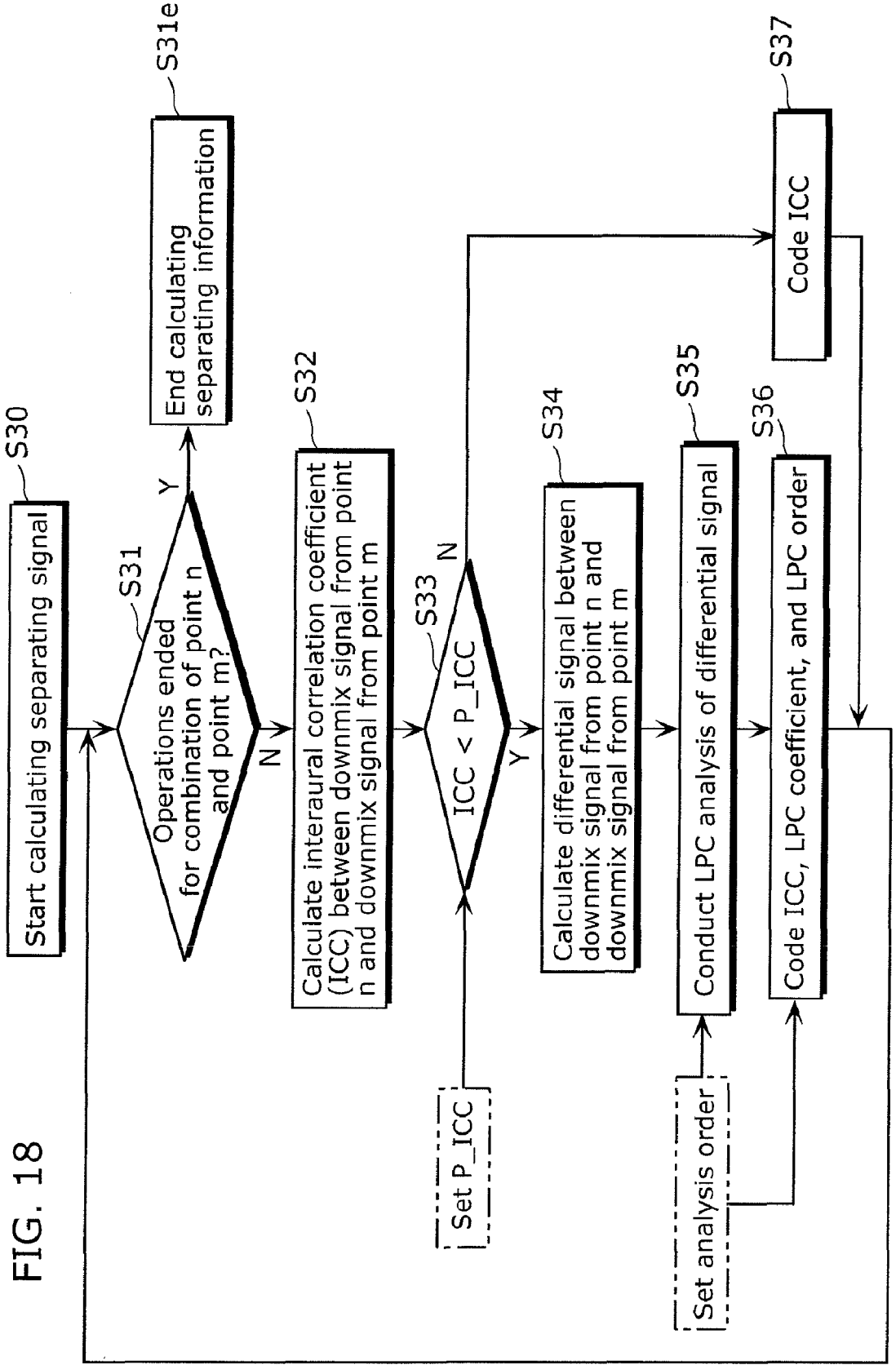
FIG. 18 is another flowchart to show how to calculate the downmix separation coefficient.

FIG. 18 is a flowchart describing a calculation of a first downmix separation coefficient.

According to Expression 3, interaural correlation coefficients (ICC) of the PCMS 1 and 2 are calculated out of the PCMS 1 and 2 in which the downmix coding signals 201 and 204 (FIG. 6) from the respective points 1 and 2 are coded (Step S32). The next step involves detecting whether the absolute value of the calculated interaural correlation coefficients (ICC) is greater or smaller than a predetermined threshold value P_ICC (Step S33). When the absolute value is smaller than the P_ICC (Step S33:Y), a differential signal between the PCMS 1 and 2 is calculated. It is noted that the P_ICC represents, for example, 0.5. This value, previously set in the stream synthesizing device 100 (FIGS. 4 and 5), varies between 0 and 1.0, and can be freely changed by the user. Accordingly, the value set to 0.5 in the above shall not be limited to this.

Step S35 involves LPC analysis of a differential PCM signal, using a predetermined order, to calculate LPC coefficients and a differential signal. Non-Patent Reference 4 describes an example of the LPC analysis.

Step S36 involves coding the interaural correlation coefficients (ICC), the LPC coefficient, and the LPC analysis order all of which are calculated through the above process to generate the downmix separating information. Further, when the absolute value of the interaural correlation coefficients (ICC) is not smaller than the predetermined threshold P_ICC, only ICC information shall be transmitted as the downmix separating information. These calculations are repeated as many as the number of combinations of all the transmission points (Step S31) to obtain ICC and LPC coefficients. The embodiment involves one looping. It is noted that Step S31 involves determining whether or not each of the above-described operations in Steps S32 to S37 is ended for each and all the combinations of the transmitting points. Then, in Step S31e, when the operations are determined to be ended for all the combinations in Step S31 (Step S31:Y), the processing in FIG. 18 (the calculation of the first downmix separation coefficient) is ended. Further, when the operations are determined not to have been ended for all the combinations in Step S31 (Step S31:N), the operations in Steps S32 to S37 are initiated on one of the combinations not having been ended.

Figure 17:
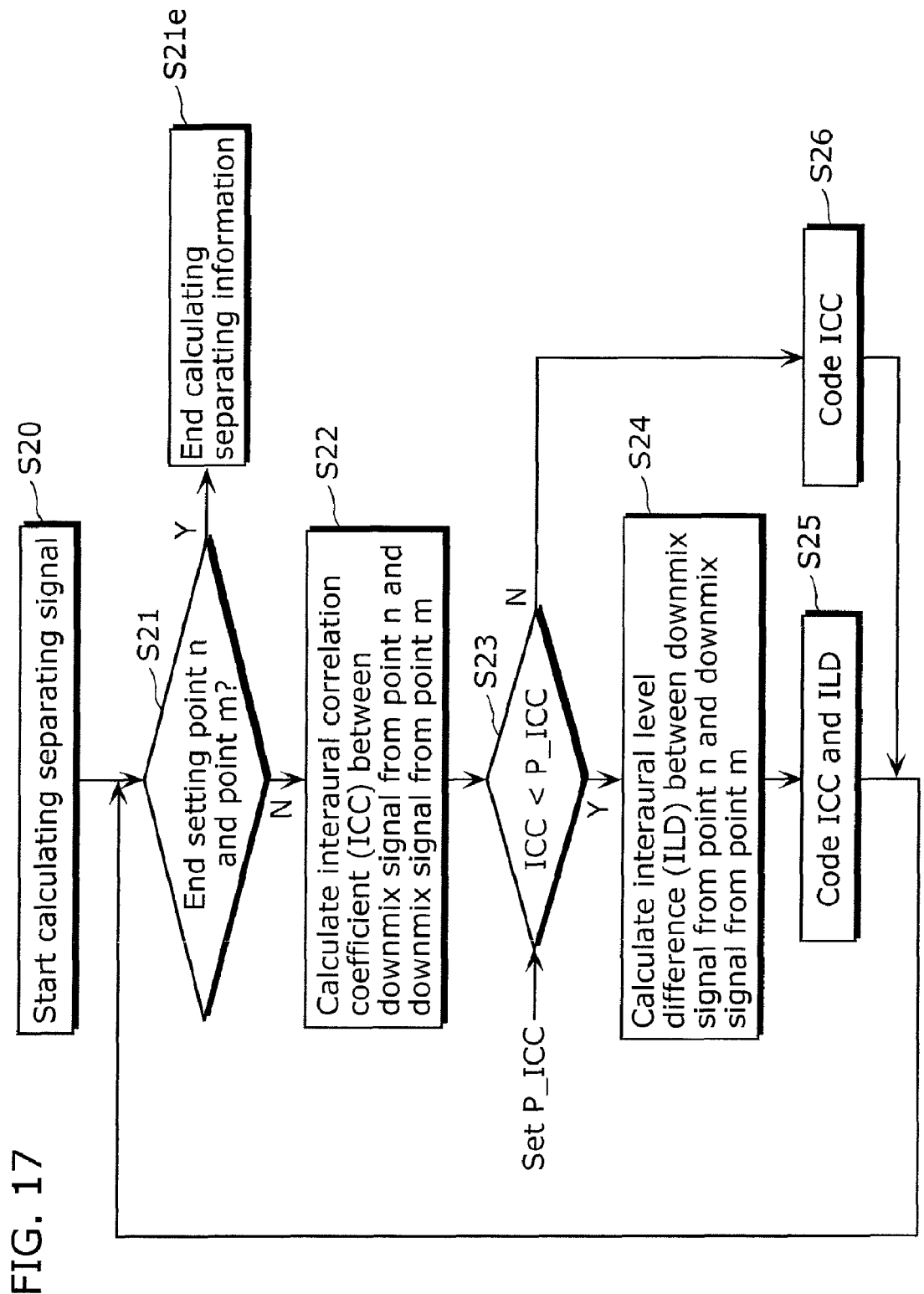
FIG. 17 is a flowchart to show how the stream synthesizing unit calculates a downmix separation coefficient.

FIG. 17 is a flowchart showing a calculation of a second downmix separation coefficient in the stream synthesizing unit 100.

The downmix separating information may also be calculated according to the flowchart in FIG. 17. According to Expression 3 (above-referenced), Step S22 involves calculating the interaural correlation coefficients (ICC) of the PCMS 1 and 2 out of the PCMS 1 and 2 in which the downmix coding signals 201 and 204 (FIG. 6) from the respective points 1 and 2 are coded. Next, Step S23 involves detecting whether or not the absolute value of the calculated interaural correlation coefficients (ICC) is greater or smaller than the predetermined threshold P_ICC. When the absolute value is smaller than the P_ICC, (Step S23:Y), Step S24 involves calculating the interaural level difference (ILD) out of the PCM signals 1 and 2 in accordance with Expression 2. The calculated ILD and ICC are transmitted as the downmix separating information. When the absolute value of the interaural correlation coefficients (ICC) is not smaller than the predetermined threshold P_ICC (Step S23:N), only the interaural correlation coefficients (ICC) information shall be coded and transmitted (Step S26). These calculations are repeated as many as the number of combinations of all the transmission points (Step S21:N) in order to provide the ICC, the ILD, and LPC coefficients. When an output point of the stream synthesizing unit 100 is the point 3 in the embodiment, the ICC and the ILD are calculated for the combination of the points 1 and 2. Similarly, when an output point is the point 1, the above-described ICC, ILD, and LPC are calculated for the downmix signals of the points 2 and 3. The above calculations have described the case having three points. However, the number of the points shall not be limited to three. The calculations are applicable to the case where three or more points are found.

It is noted that Step S21 involves determining whether or not the above-described each of operations in Steps S21 to S26 is finalized for each and all the combinations of the transmitting points. Then, in Step S21e, when the operations are determined to have been ended for all the combinations in Step S21 (Step S21:Y), the processing in FIG. 17 (the calculation of the second downmix separation coefficient) ends. Further, in Step S21, when the operations are determined not to have been ended for all the combinations (Step S21:N), the operations in Steps S22 to S26 are initiated on one of the combinations not having been ended.

Figure 19:
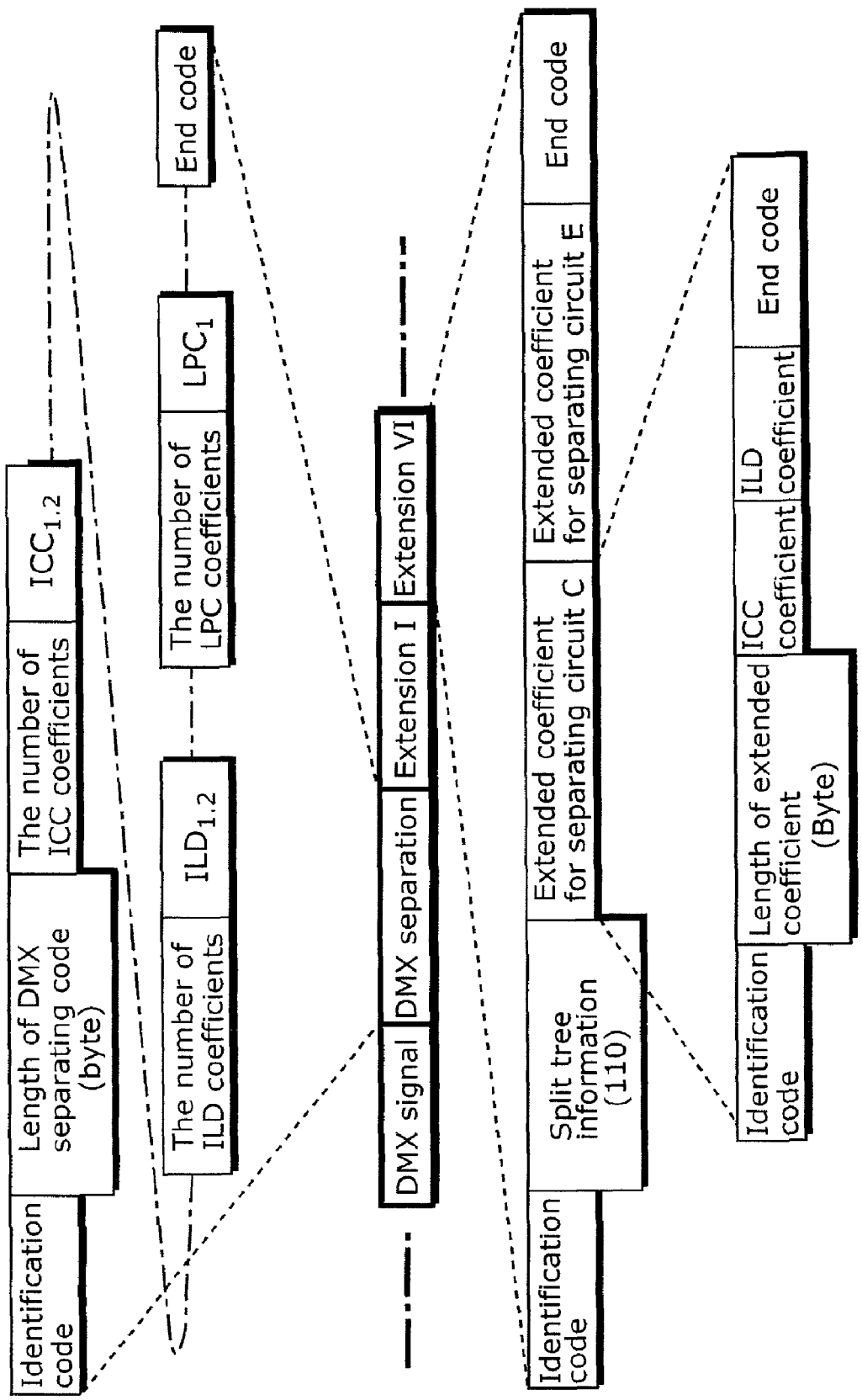
FIG. 19 exemplifies a coded stream in the first embodiment of the present invention.

FIG. 19 illustrates a structure of the downmix separating information (DMX separation).

Figure 15:
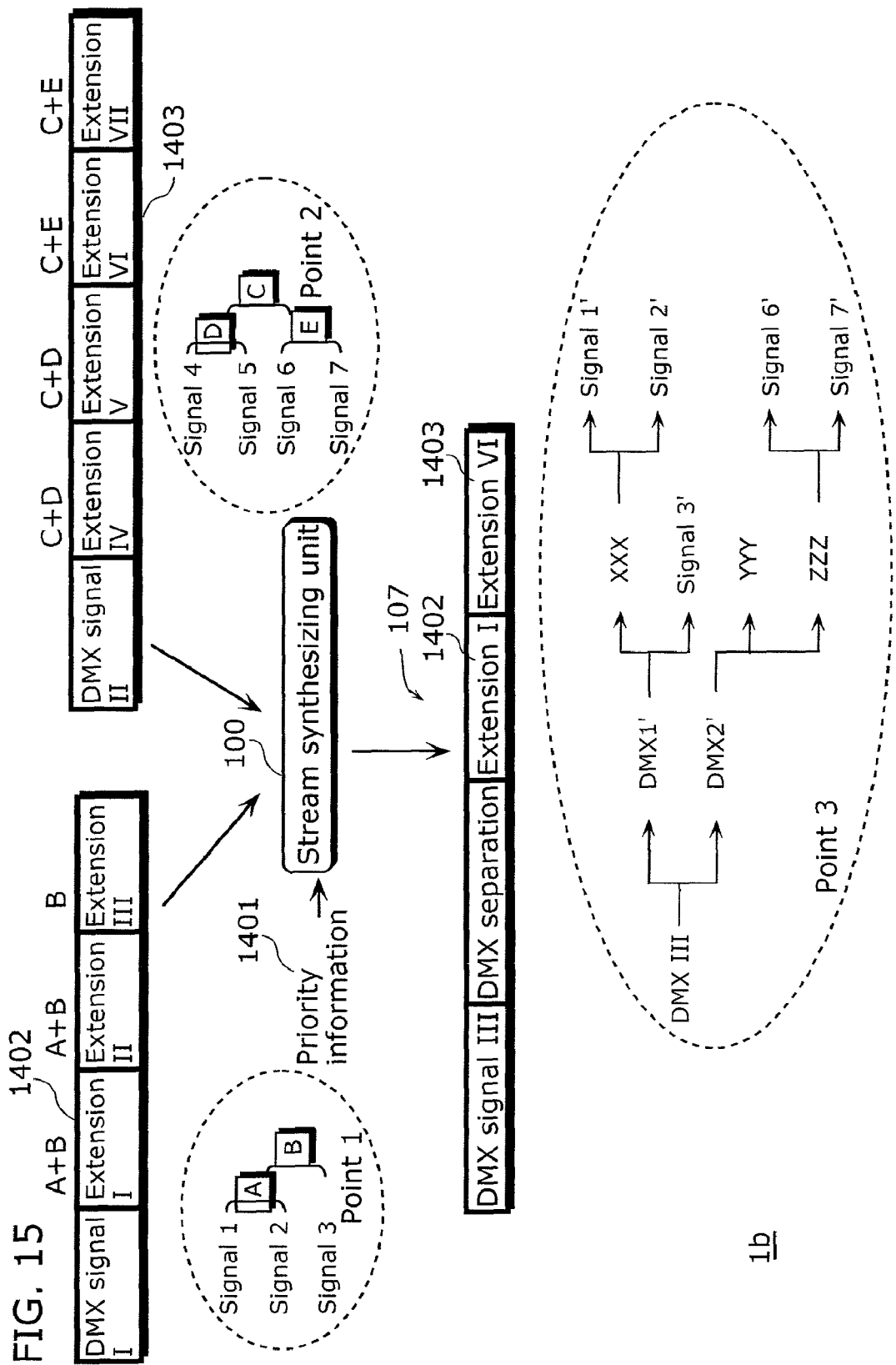
FIG. 15 exemplifies another multipoint connection in the first embodiment of the present invention.
Figure 20:
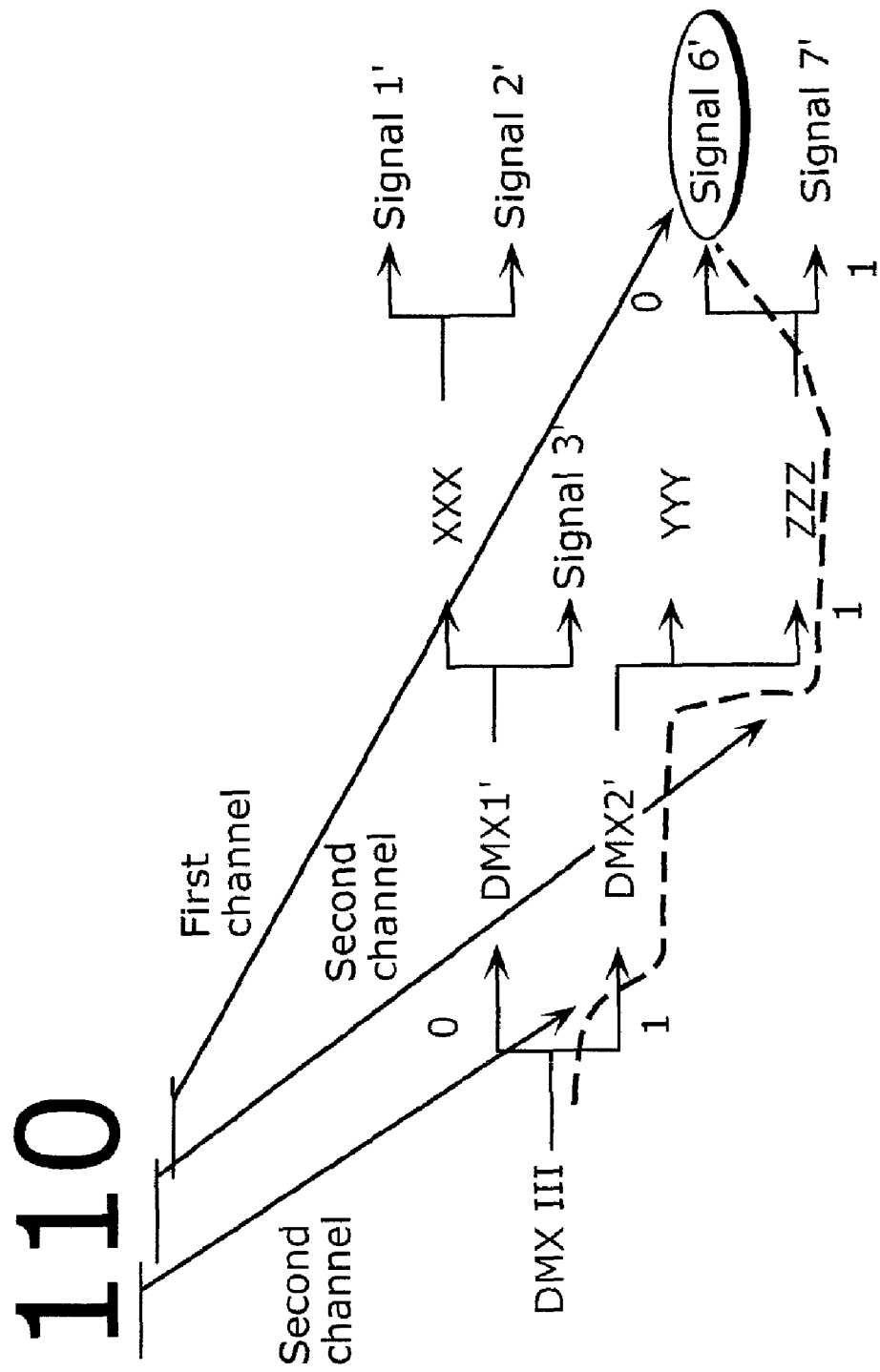
FIG. 20 exemplifies split tree information held in the coded stream.

The starting position of the downmix separating information is a region showing the subsequent information is downmix separating information, which identifies the subsequent information as downmix separating information or extended information on each of the points. Following the region, the downmix separating information stores length information of a DMX separating code indicating the number of bytes the entire downmix separating information has. Following the length information, the downmix separating information stores the number of the interaural correlation coefficients (ICC). This number corresponds to the number of combinations of all the transmission points described above. The downmix separating information also holds the number of pieces of level difference information (ILD) between channels and a value of each of the pieces of the ILD. Following the number of the pieces and the value of ILD, the downmix separating information holds the LPC analysis order obtained by the LPC analysis and each of LPC coefficients. Following the DMX separating information (downmix separating information) is the extended information for separating each of the points and signals. In the case of FIG. 19, each piece of extended information (the extended information 1402 and the extended information 1403) is provided to the downmix separating information as shown in FIG. 15. Thus, at the starting point, the downmix separating information includes, as extension 6, an identification code of which extended information is a signal separating "the point 2 and the signal 6". After the identification code, the split tree information shown in FIG. 20 is held, followed by extended coefficients for separating circuits C and E (an ICC coefficient and an ILD coefficient).

As described above, switching the content of the downmix separating information according to a varying absolute value of the interaural correlation coefficients (ICC) is effective in reducing the calculation amount required for calculating the downmix separating information at an MCU.

It is noted that the embodiment exemplifies the MPEG-AAC technique as the downmix signal. When the downmix signal uses a coding technique with the LPC analysis, the streams can be synthesized by arithmetic addition and liner interpolation processing with the use of LSP coefficients obtained as a result of the LPC analysis when calculating the above downmix separating information. In other words, this means that the downmix separating information can be calculated in a state of a bit stream, which usually dispenses with coding under heavy load, and thus easily makes possible obtaining the downmix separating information. The TwinVQ technique described in Non-Patent Reference 5 exemplifies a technique to use the LPC analysis for coding.

A conventional technique does not assign downmix separating information to a stream at all. In addition to typical signal separating parameters (interaural level difference (ILD) and interaural correlation coefficients (ICC)), the stream synthesizing unit 100 in the present invention further transmits an LPC coefficient of a differential PCM.

Here, the LPC analysis is provided to the differential PCM instead of to the PCMS 1 and 2 because this makes possible compressing the dynamic range of an acoustic signal. This results in implementing a circuit structure eliminating the need for a wide dynamic range for a decoding unit, which is beneficial in reducing a circuit cost. As a matter of course, providing the LPC analysis to the differential PCM contributes to an improvement in a performance for separating a downmix signal. The downmix separating information 208 (FIG. 5) is calculated and coded between PCMS 1 and 2. Further downmixing the downmix coded signals at the points 1 and 2, possibly having totally different acoustic characteristics, eliminates acoustic characteristics which the downmix coded signals have originally had. The eliminated acoustic characteristics cannot be recovered by extending the signals with the acoustic characteristics eliminated. Hence, generating the extended information of the downmix coded signal, as described above, is essential in order to retain the acoustic characteristics without increasing an information amount as possible.

The downmix coded signal 207 (FIGS. 5 and 6) and the downmix separating information 208 (FIG. 5) which are obtained above, and the extended information 202, 203, 204, and 205 all of which is included in the coded information 101 and 102 (FIG. 5) are multiplexed by the multiplexing circuit 106 (FIG. 4), and transmitted to the point 3, as coded information 107, by the output unit I2 (FIG. 4).

Figure 7:
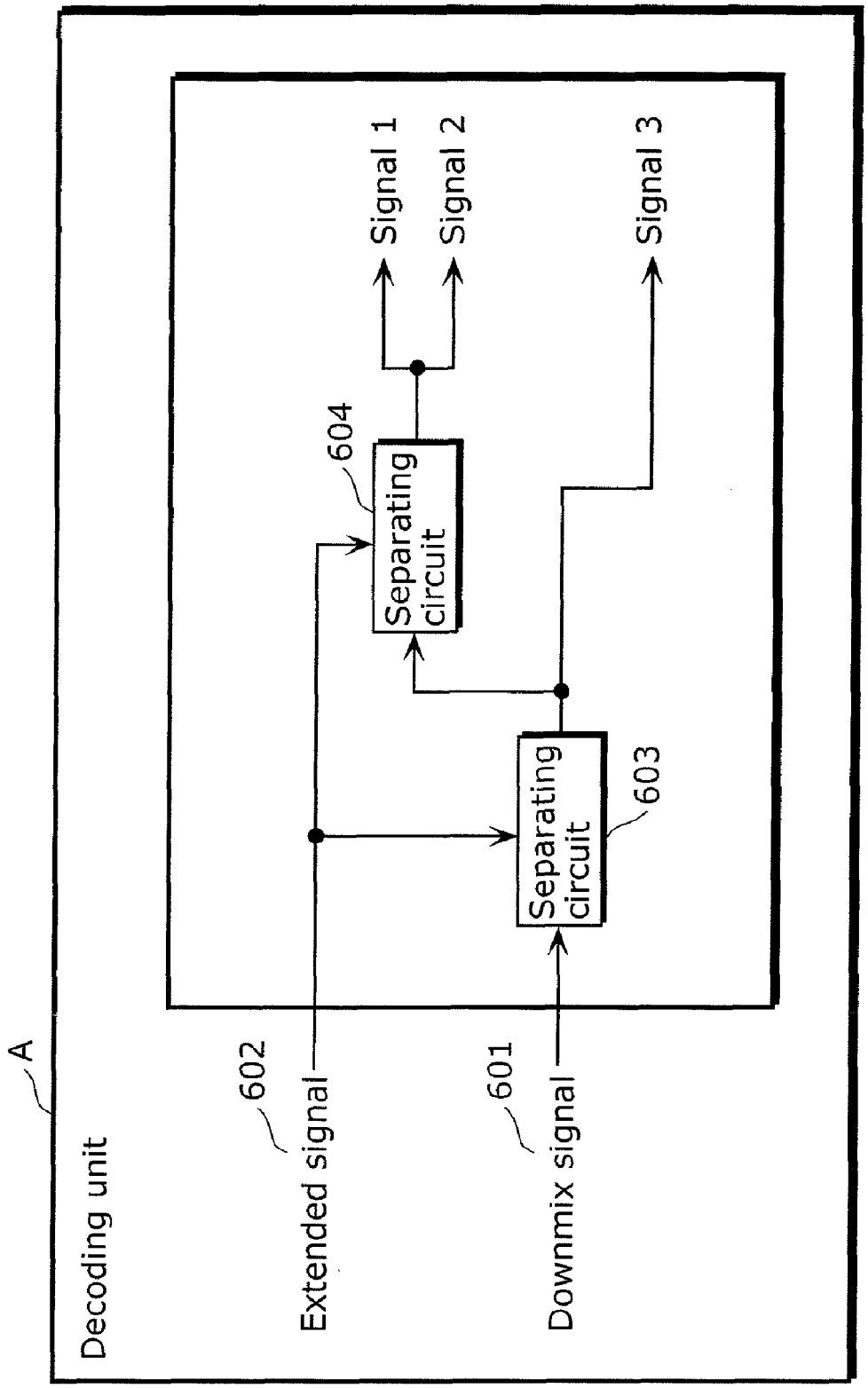
FIG. 7 shows a decoding unit in the first embodiment of the present invention.
Figure 8:
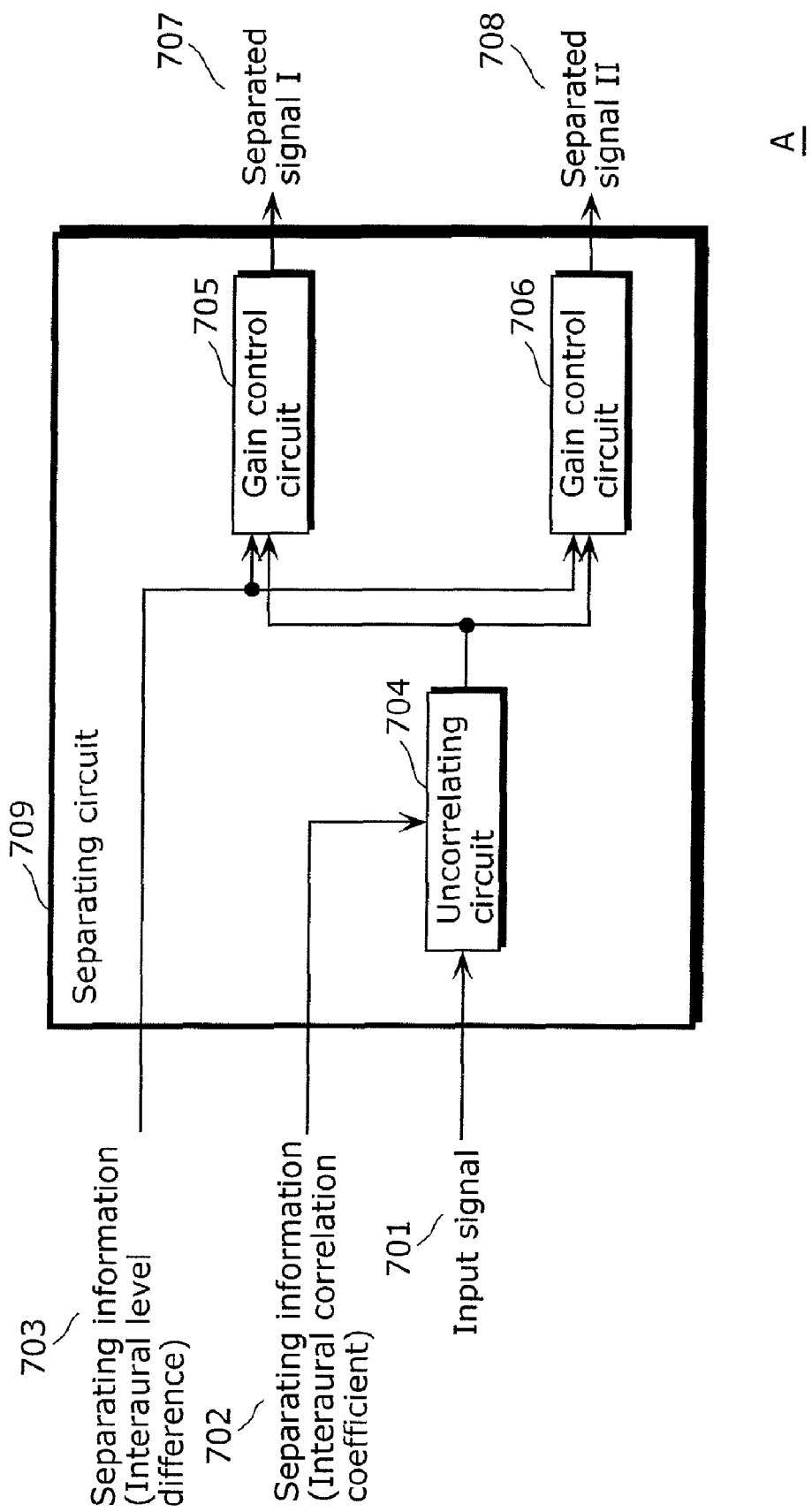
FIG. 8 shows a separating circuit in the first embodiment of the present invention.

Next, a decoding unit receiving the downmix coded signal and the extended information shall be described. A decoding unit A (FIG. 5) first separates the downmix signal and the extended signal, and then decodes the downmix coded signal on a predetermined coding circuit. It is noted that the process described in Non-Patent Reference 2 is adopted when the MPEG-AAC technique is utilized. Based on the decoded PCM signal obtained as a result of the decoding and the aforementioned separated extended information, independent plural acoustic signals are decoded. FIGS. 7 and 8 show an example of the decoding circuit.

It is noted that the decoding unit A is, for example, a functional block of a function realized in the point 3. To be more specific, for example, the decoding unit A is a functional block of a function to be realized by a computer in the point 3 executing a software stored in the computer.

FIG. 7 illustrates the decoding unit A (FIG. 5).

Citing the point 1 as an example, the decoding unit A in FIG. 7, including separating circuits 603 and 604 connected in multistage, receives a downmix signal 601 and an extended signal 602 both obtained as PCM signals. The OTT circuit and the TTT circuit of the MPEG-Surround disclosed in Non-Patent Reference 3 are exemplified as separating circuits. FIG. 8 exemplifies a simple separating circuit.

FIG. 8 shows a separating circuit 709 included in the decoding unit A.

Based on: the input signal 701, the interaural level difference (ILD. Referred to as the separating information (interaural level difference) 703 in FIG. 8) described in Expressions 2 and 3; and the interaural correlation coefficients (ICC. Referred to as the separating information (correlation value) 702 in FIG. 8), the decoding unit A first causes an uncorrelating circuit 704 to uncorrelate the input signal 701. It is noted that the Decorrelator circuit in Non-Patent Reference 3 executes the above operation. The uncorrelation by uncorrelating circuit 704 is not limited to this. Non-Patent Reference 6, for example, discloses a technique to uncorrelate the signal, utilizing the Levinson-Durbin algorithm.

The input signal 701 travels through the uncorrelating circuit 704 and has the gain controlled by gain controlling circuits 705 and 706. Then, separated signals 707 and 708 are obtained.

Based on the interaural level difference (ILD) 703, the gain controlling circuits 705 and 706 execute the following calculations:

$$\text{Sig1}=\text{Deco}(\text{Input801}(n))*\text{Gain}(i) \quad \text{(Expression 6)}$$

$$\text{Sig2}=\text{Deco}(\text{Input801}(n))*(1-\text{Gain}(i)) \quad \text{(Expression 7)}$$

where the Dec operator denotes uncorrelation of the signal, and Sig1 and Sig2 denote the separated signals 707 and 708 (FIG. 8). A sequence of the processing described above enables desired independent plural monophonic or stereophonic signals to be decoded out of the downmix extended coded signal.

It is noted that a coding apparatus and a decoding unit, using the MPEG-Surround technique, described in Non-Patent Reference 3, may be used in processes to calculate the extended information and to decode the original independent signals out of the downmix signal and the extended information both obtained as the PCM signals. The coding technique used in the processes is not limited to the MPEG-Surround technique. Moreover, the coding technique used in the processes shall not be limited to the MPEG-Surround technique. As a matter of course, the present invention is effective for a parametric multi-channel space-coding technique (including the MP3 surround technique) which codes and decodes a multi-channel signal with a downmix signal and extended information.

Figure 11:
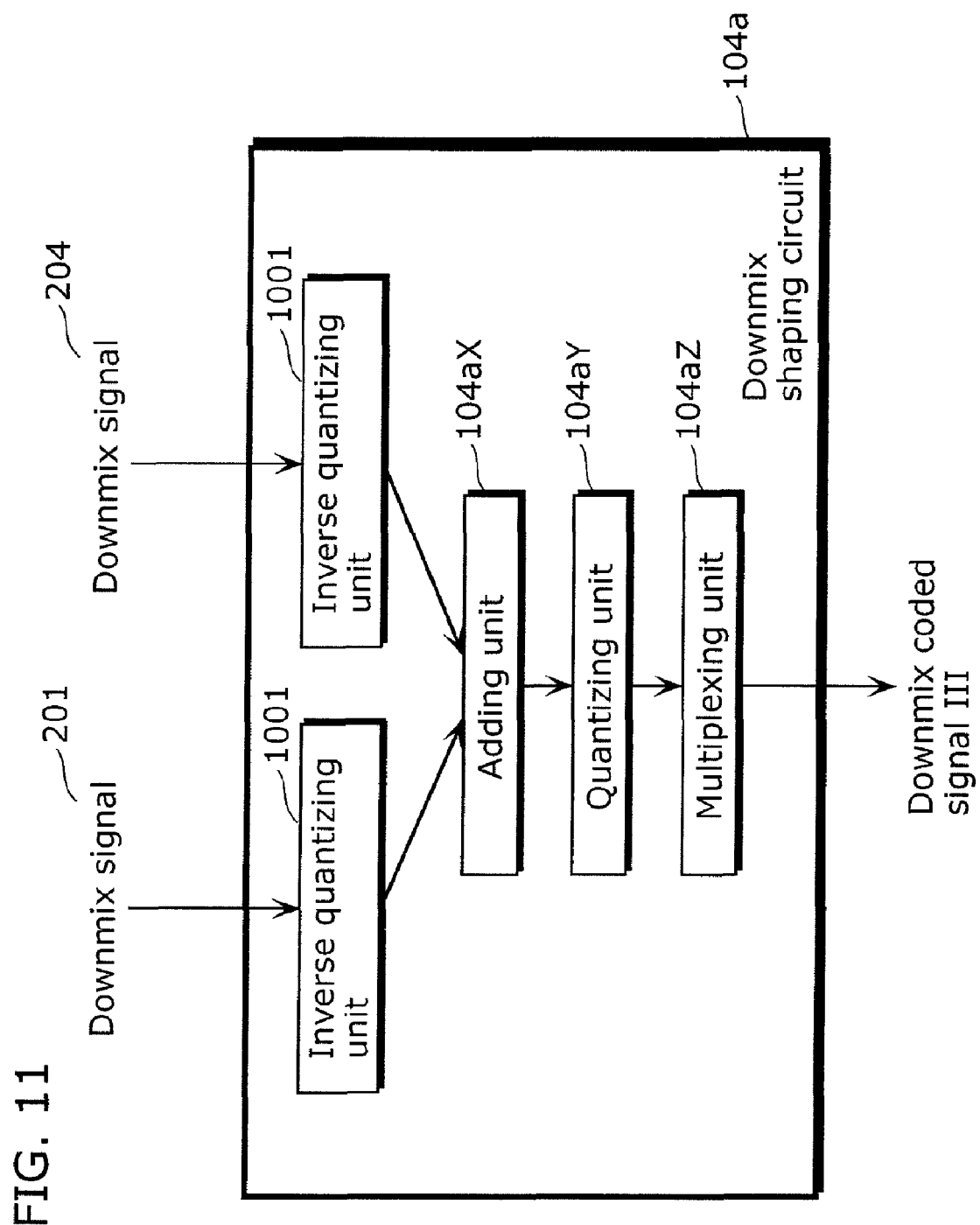
FIG. 11 shows a downmix shaping circuit in the third embodiment of the present invention.

FIG. 11 shows a downmix shaping circuit 104a. The stream synthesizing unit 100 may include the downmix shaping circuit 104a.

The above has exemplified the stream synthesizing unit 100 temporally decoding the separated downmix coded signals in the PCM signals, and downmixing the PCM signals. The following is another example of decoding and downmixing. In the MPEG-AAC technique, a decoding process of downmix signals provided to the downmix shaping circuit 104a (FIG. 11) is described in Non-Patent Reference 1. An outline of the decoding involves decoding the separated downmix signals in the PCM signals via each of an analysis of the coded information, inverse quantization, and time-frequency transform. Upon analyzing the coded information, each of the provided downmix signals 201 and 204 is inverse-quantized (Requantize) by an associated inverse quantizing unit 1001. A detailed process described in Non-Patent Reference 1 is summarized below. Each of the inverse quantizing units 1001 calculates spectral information (Spec(n)) as follows:

$$Spec(n)=Gain(n)*2^{\char`\^}(QuantizeValue(n)*4/3) \quad \text{(Expression 8)}$$

where QuantizeValue(n) is a quantized value obtained by downmixing, and Gain(n) is quantized Gain of the frame.

Performing inverse-quantization on each of the provided downmix signals 201 and 204 obtains two pieces of spectral data (Spec201(n), and Spec204(n)). An adding unit 104aX adds these pieces of spectral data, using Expression 9, to obtain a synthesized spectrum Spec(n).

$$Spec(n)=0.5*Spec201(n)+0.5*Spec204(n) \quad \text{(Expression 9)}$$

It is noted that the coefficient is not limited to 0.5. Any given coefficients for Spec201(n) and Spec204(n) shall be provided as far as a relationship similar to Expression 7 holds. The synthesized spectrum obtained above is re-quantized by the quantizing unit 104aY with the MPEG-AAC technique. The resultant of the re-quantization is the downmix signal 207 included in the coded information 107 (FIG. 5) provided from the stream synthesizing unit 100. Inverse-quantization followed by addition means performing addition in frequency information. This eliminates the need for time-frequency transform (including the MDCT processing) required to restore the separated downmix coded signals to the PCM signals, allows the stream synthesizing unit 100 to dispense with a high-calculation performance, and leads to the reduction of a production cost and a designing cost of the stream synthesizing unit 100.

The stream synthesizing unit 100 (MCU) implemented above is an embodiment of the present invention, and shall not be limited to this. Further, the represented number of the pieces of coded information, provided by the stream synthesizing unit 100, is two. The number, however, shall not be limited to two. Three or more pieces of the coded information shall be adopted.

The following is a modification example of the first embodiment.

It is noted in the first embodiment that the downmix separating information is added by the stream synthesizing unit 100. Meanwhile, another effect can be observed by adding the following information.

Figure 14:
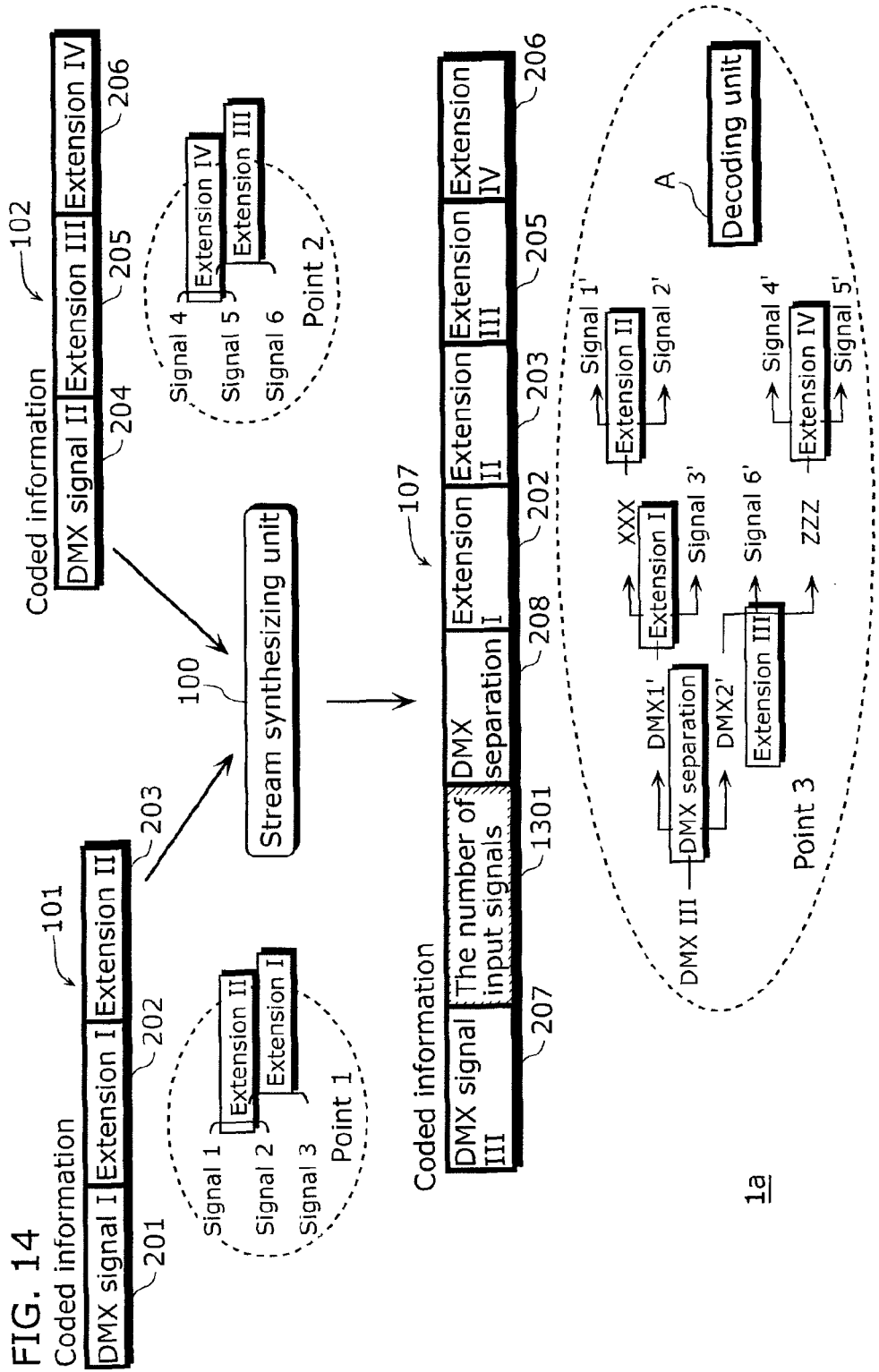
FIG. 14 exemplifies a multipoint connection in the first embodiment of the present invention.

FIG. 14 illustrates a system 1a.

Figure 2:
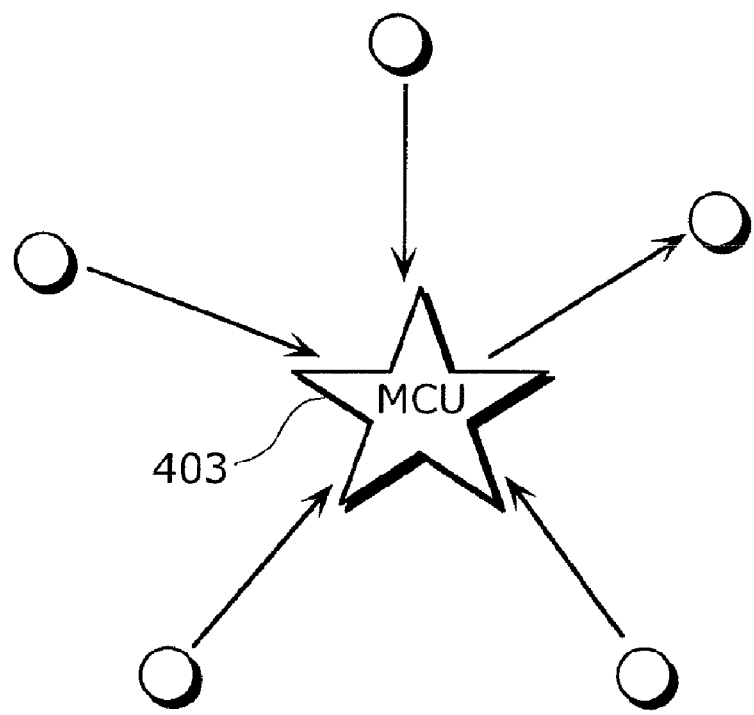
FIG. 2 illustrates a type of communications path.
Figure 3:
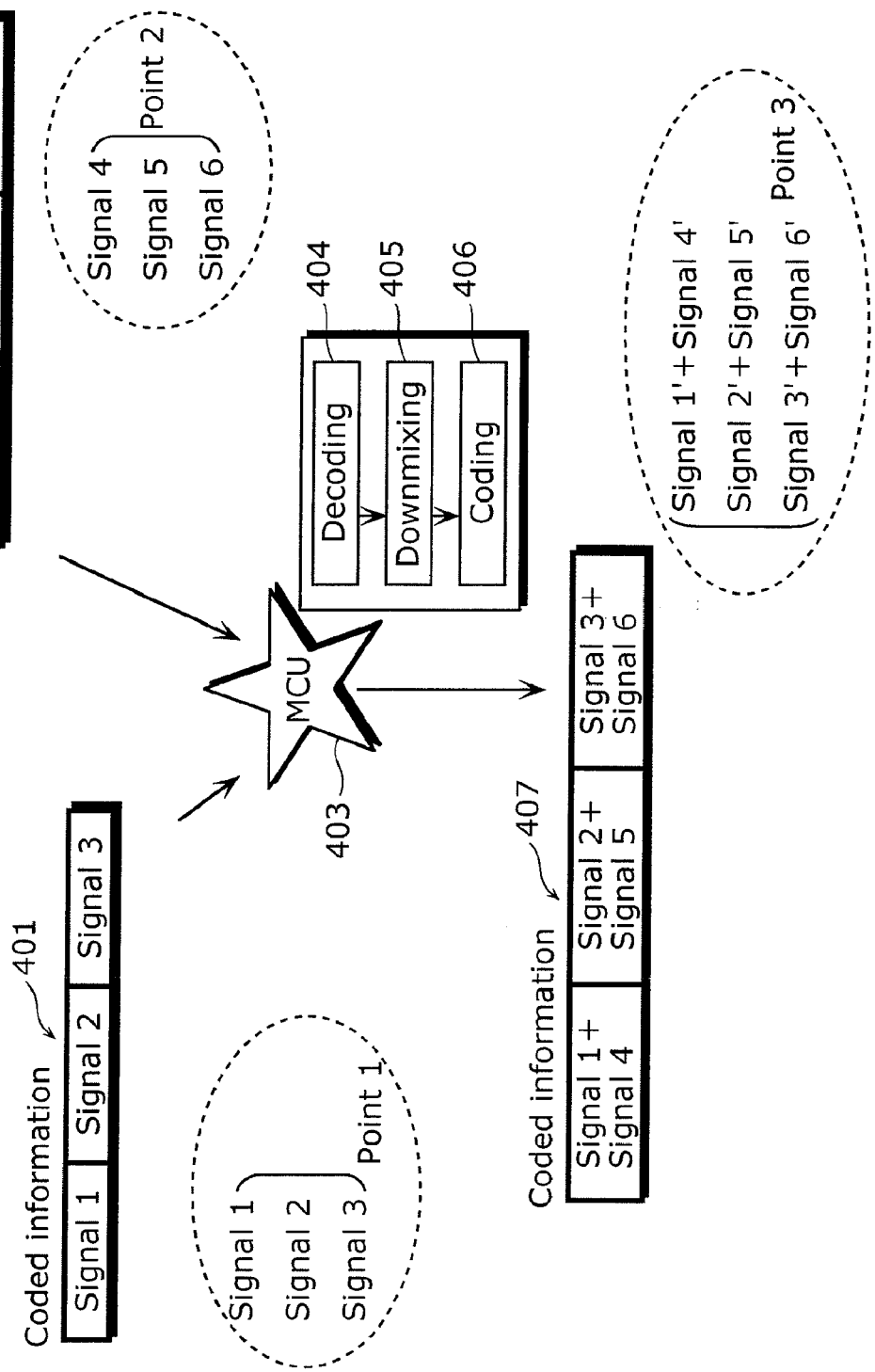
FIG. 3 shows a problem in multi-channel multipoint communications.

FIG. 14, for example, shows that the system 1a causes the stream synthesizing unit 100 to add the number of input signals at each of the points, in addition to the downmix separating information 208 (FIG. 2). In FIG. 14, the number of input signals 3 at the point 1 and the number of input signals 3 at the point 2 are added. Then, the stream synthesizing unit 100 stores an added value "6" in the coded information 107 as the number of signals information 1301. Thus, the stream synthesizing unit 100 transmits the coded information 107 to the point 3. Receiving the coded information 107, the decoding unit A in the point 3 first obtains the number of signals information 1301, at each of the transmission points, included in the coded information 107. At this moment, the separation and extension of the downmix signal 207, using information for separating the signals at each of the points (the extended information 202, 203, 205, and 206), is not performed.

An apparatus to decode and reproduce the coded information 107 includes a rendering apparatus to perform different processing on the decoded signals depending on the number of reproduction channels. The rendering apparatus sorts decoded signals 1' to 5' with respect to each reproduction channel. The case where five decoded signals and two reproduction channels is exemplified as follows:

$$o1=s1+0.5*s2+1/\sqrt{2}*s3$$

$$o2=s4+0.5*s2+1/\sqrt{2}*s5 \quad \text{(Expression 10)}$$

where decoded signals 1 to 5 are s1 to s5, and reproduction channels are o1 and o2, respectively. A coefficient used for the above calculation is rendering information. As the rendering information, a downmix coefficient cited in the ITU-R BS.775-1 standard is used. This rendering coefficient is determined based on the sorting of the reproduction channel signals by the decoding unit. In the above example, signals s1, s2, s3, s4, and s5 represent left-front, front, left-back, right-front, and right-back channel signals, respectively. These channel signals are forwarded to a front output channel o1 and a right-front output channel o2.

In the structure of the modification example, the rendering information used by the rendering apparatus is determined when the sum of the number of input signals is detected before extending the downmix signal 207. This permits a rendering information portion and the coded information 107 to be simultaneously decoded by calculating in parallel, which leads to a significant reduction in an amount of delay in signal processing.

FIG. 15 shows a system 1b.

When synthesizing to transmit extended information of each point, the stream synthesizing unit 100 in the embodiment is assumed to configure pieces of the extended information in the order of priority of each point and input signal. In the case where the input signal 1 of the point 1 has the highest priority, and an input signal 6 of the point 2 has the second highest priority, for example, the coded information 107 is formed in the order of extended information 1402 (information to separate the signal 1 of the point 1) followed by extended information 1403 (information to separate the signal 6 of the point 2) in accordance with priority information 1401 as shown in FIG. 15. This configuration enables round-off processing based on the priority in the case where all of the coded information 107 cannot be processed when the decoding unit A decodes the coded information 107 transmitted from the stream synthesizing unit 100 to the point 3. In other words, since the coded information 107 includes signals and pieces of the extended information arranged in the order of priority from the starting position, the stream synthesizing device 100 may round-off the extended information 1403 when the decoding processing apparatus is merely required to process up to a piece of extended information having the highest priority. This enables the decoding to be performed just once, reducing the number of times of decoding to half as many as the number of times of decoding on all of the coded information, and thus leads to realizing a more power-saving decoding processing apparatus.

The priority information 1401 is determined as follows. First, the stream synthesizing unit 100 detects which point provides a large number of signals (transmission frequency). Then, the stream synthesizing unit 100 detects the piece of extended information transmitted most frequently out of the extended signals included in the points transmitting in great frequency. At another point, the priority information is generated through a similar process. Thus, priorities of all the points and input signals are calculated. According to the priorities, the stream synthesizing unit 100 rearranges the pieces of extended information. Then, the stream synthesizing unit 100 uses the order of the pieces of the prioritized extended information to arrange and transmit the pieces of extended information in order.

Figure 21:
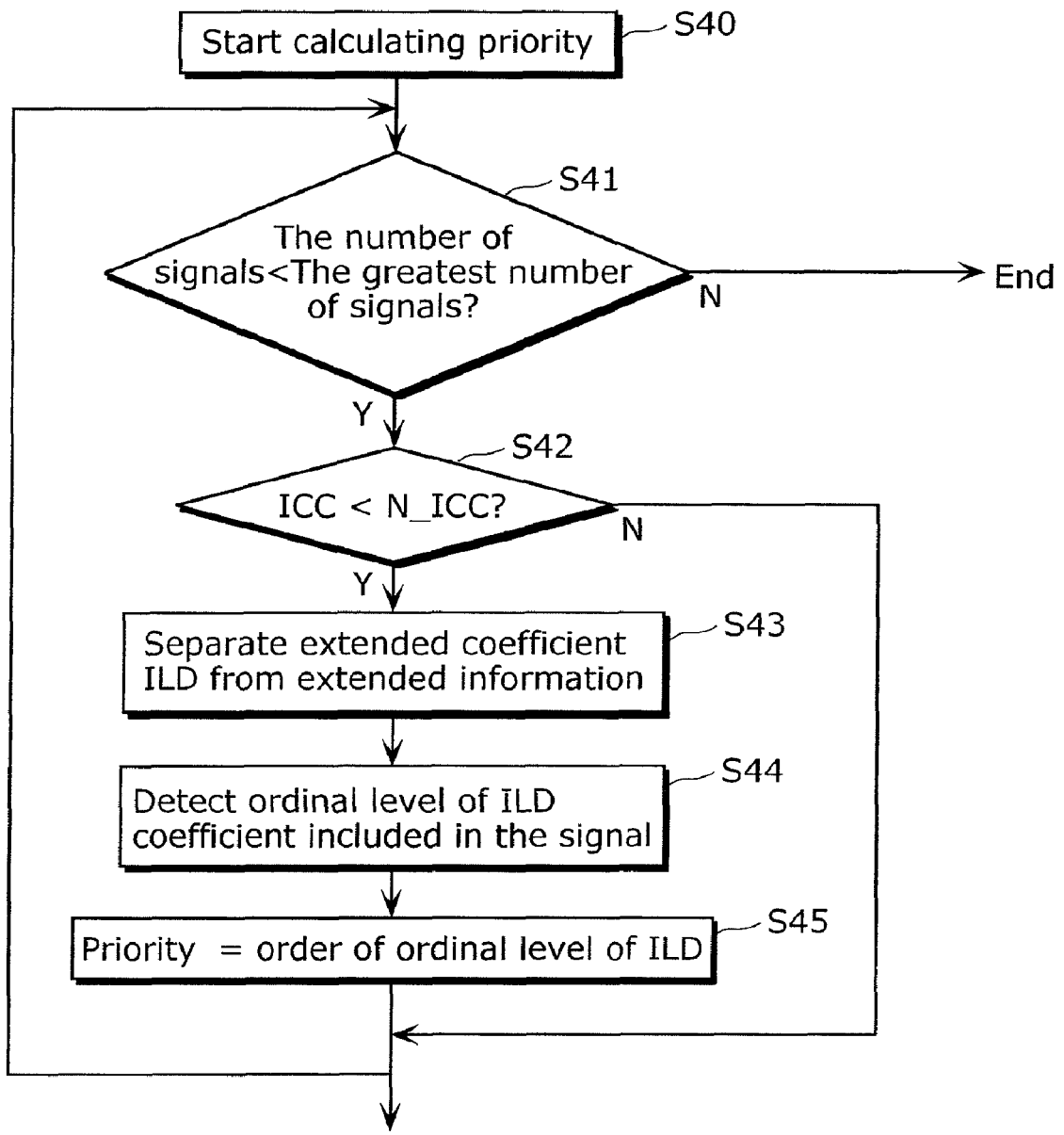
FIG. 21 is a flowchart to show a process to calculate a priority in the stream synthesizing unit.

FIG. 21 is a flowchart showing a priority calculating process.

The priority can be detected by another configuration, as well. As shown in FIG. 21, an ICC value of each input signal is separated. When the ICC value is smaller than a predetermined N_ICC value set by the stream synthesizing unit 100 (Step S42:Y), an extended coefficient ILD is further separated from the extended information (Step S43). Thus, the priority is set in accordance with the separated extended coefficient ILD. In other words, by calculating each of ordinal levels of the ILD coefficient included in every signal (Step S44), the ILD coefficient is set as the priority of each signal (Step S45). While the stream synthesizing unit 100 in the present invention is operating, the N_ICC value remains constant at a value set in an initial phase. As a matter of course, the priority may be variable with an advancing elapsed time, as needed. A variable priority with an advancing elapsed time makes possible adjusting detection accuracy of the priority order, which can realize a first-ever stream synthesizing unit that is flexible enough to adjust the priority.

Next, an extra description added to the description of the first embodiment shall be provided. It is noted that the following extra description shall not offer any limitations to the content of the above description.

FIG. 5 illustrates a structure of the system 1.

In a meeting among users at each of points, the system 1 is a multipoint teleconferencing system transmitting an acoustic signal from a transmission point to a reception point and reproducing the transmitted acoustic signal at the reception point, the acoustic signal which is included in a speech of the meeting. Specifically, the system 1 transmits plural acoustic signals from the transmission point to the reception point to cause the reception point to reproduce the plural acoustic signals, so that a user at the reception point enjoys a true-to-life atmosphere.

It is noted that the following exemplifies each of the points 1 and 2 to be assigned as the transmission point and the point 3 as the reception point.

Each of the points has microphones (not shown) and a computer. The computer generates coded information (the coded information 101 and coded information 102 in FIG. 5) specifying plural acoustic signals (PCM signals), and transmits the generated coded information to the stream synthesizing unit 100, the plural acoustic signals which are picked up by each of the microphones. Further, the computer at each of the points receives from the stream synthesizing unit 100 coded information (the coded information 107 in FIG. 5) generated by the stream synthesizing unit 100, and reproduces each of the acoustic signals specified by the received coded information. Here, the coded information 107 is generated in accordance with coded information (the coded information 101 and the coded information 102 in FIG. 5) transmitted from a point other than the reception point to the stream synthesizing unit 100.

FIG. 4 shows a structure of the stream synthesizing unit 100.

The stream synthesizing unit 100 includes several separating circuits 103 having the separating circuit 103, the downmix shaping circuit 104, the extended information calculating circuit 105, and the multiplexing circuit 106.

As each of the coded information 101, the coded information 102, and the coded information 107 shows, the coded information includes a DMX signal (the downmix coded signal) and extended information. It is noted that a DMX signal in the coded information 101 shown in FIG. 4 is the DMX signal 201, and the extended information includes the entire extended information 202 and the extended information 203. Further, the DMX signal in the coded information 102 is the DMX signal 204, and the extended information includes extended information 205 and extended information 206. Moreover, the DMX signal in the coded information 107 is a DMX signal 207, and the extended information includes the downmix separating information 208, the extended information 203, the extended information 202, the extended information 205, and the extended information 206.

The extended information specifies characteristics of plural acoustic signals of the coded information in which the extended information is included. Specifically, the extended information specifies the interaural level difference (ILD) and the interaural correlation coefficients (ICC) among the plural acoustic signals. To be more specific, the extended information include quantized and Huffman-coded processed data with respect to the interaural level difference (ILD) and the interaural correlation coefficients (ICC) of the acoustic signals. Thus, the extended information includes the above processed data to specify the pre-processed interaural level difference (ILD) and interaural correlation coefficients (ICC) which are calculated out of the processed data. The extended information takes advantage of the data configuration of the processed data to store the interaural level difference (ILD) and the interaural correlation coefficients (ICC). In other words, the extended information has a data configuration formed in the above processed data as a physical data configuration. The extended information also includes a data configuration of the interaural level difference (ILD) and the interaural correlation coefficients (ICC) as a logical data configuration to be stored due to the physical data configuration.

The DMX signal is included in coded information indicating the plural acoustic signals. The acoustic signals are downmixed to be a downmix PCM signal, and the downmix PCM signal is coded to be the DMX signal.

The plural separating circuits 103 each separates a corresponding DMX signal and extended information from an associated piece of coded information (the coded information 101 and the coded information 102) transmitted from the plural transmission points (the points 1 and 2 in FIG. 5) to the stream synthesizing unit 100.

It is noted that the coded information to be transmitted from the transmission point and received by the stream synthesizing unit 100 (the coded information 101 and the coded information 102) is referred to as coded information to be received. Meanwhile, the coded information transmitted by the stream synthesizing unit 100 and received at the reception point (the coded information 107) is referred to as coded information to be transmitted.

Specifically, each of the plural separating circuits 103 separates a corresponding piece of the coded information.

It is noted that each of the plural separating circuits 103 is a functional block of a function implemented in the stream synthesizing unit 100 by, for example, a software. These functional blocks may operate, for example, in parallel each other.

The downmix shaping circuit 104 and the extended information calculating circuit 105 generate the DMX signal 207 and the downmix separating information 208 in the coded information 107 (FIGS. 4 and 5) to be transmitted to the reception point (the point 3 in FIG. 5) in accordance with each of the DMX signals (the DMX signals 201 and 204: FIG. 4) and each piece of the extended information separated by the plural separating circuits 103.

FIG. 6 exemplifies a structure of the downmix shaping circuit 104 (FIG. 4). It is noted that the structure shown in FIG. 6 is an example. The downmix shaping circuit 104 and the extended information calculating circuit 105 having the above function may be in a structure which does not include any or some part of the structure in FIG. 6.

The downmix shaping circuit 104 includes the plural decoding circuits (the decoding circuits 501 and 502), the downmix circuit 503, and the coding circuit 504.

Each of the plural decoding circuits (each of the decoding circuits 501 and the like: FIG. 6) decodes the corresponding DMX signal (the DMX signals 201 and 204: FIGS. 6 and 5) into the downmix PCM signal, the DMX signal which is separated from the coded information of the associated transmission point (the points 1 and 2 in FIG. 5).

Next, the extended information calculating circuit 105 (FIG. 4) calculates the downmix separating information 208 (FIG. 5) based on the decoded downmix PCM signals each of which is from the corresponding transmission point.

Then, the downmix circuit 503 (FIG. 6) uses the downmix separating information 208 calculated by the extended information calculating circuit 105 to: downmix each of the downmix PCM signals which is from the corresponding transmission point and decoded by the associated decoding circuit (the decoding circuit 501 and the like); and generate a downmix PCM signal.

Thus, the coding circuit 504 codes the generated downmix PCM signal to provide the DMX signal 207 (see FIG. 5).

The multiplexing circuit 106 (FIG. 4) generates the coded information 107 (FIGS. 4 and 5) based on the DMX signal 207 generated by the downmix shaping circuit 104 and the downmix separating information 208 calculated by the extended information calculating circuit 105. Specifically, based on the DMX signal 207, the downmix separating information 208, and the pieces of extended information (the extended information 202, the extended information 203, the extended information 205, and the extended information 206 in FIG. 5) which are from each of the transmission points (the points 1 and 2 in FIG. 5) and are separated by the plural separating circuits 103, the multiplexing circuit 106 generates the coded information 107 including the DMX signal 207, the downmix separating information 208 and the pieces of extended information from each of the transmission points.

Meanwhile, the reception point (the point 3) has a decoding unit (the decoding unit A: FIG. 5) decoding the coded information 107 transmitted to the reception point by the stream synthesizing unit 100 to generate each of the acoustic signals (PCM signals) specified by the coded information 107.

The decoding unit A decodes the coded information 107 (FIGS. 5 and 4) transmitted from the stream synthesizing unit 100 to the computer at the point 3. The decoding unit A decodes the coded information 107 to generate the DMX signals (the DMX signals 201 and 204 in FIG. 5) from each of the transmission points (the points 1 and 2) and the pieces of extended information (the extended information 202, the extended information 203, the extended information 205 and the extended information 206). The decoding unit A uses each piece of generated information to generate each of the acoustic signals at the associated transmission point and reproduce each of the generated acoustic signals.

FIG. 8 illustrates the separating circuit 709 included in the decoding unit A.

Out of the input signal 701, the correlation value 702, and the interaural level difference (ILD) 703, the separating circuit 709 generates the separated signals 707 and 708 separated from the input signal 701.

The input signal 701 is, for example, the DMX signal 207 included in the coded information 107 which the stream synthesizing unit 100 transmits to the point 3. Moreover, the input signal 701 is, for example, the coded information obtained out of the DMX signal 207 through decoding (downmix decoding) more than once with the use of separating information (including the downmix separating information 208 (FIG. 5) and the extended information 202 (FIG. 5)).

The correlation value 702 is a interaural correlation coefficient (ICC) of the extended information for decoding the input signal 701.

The interaural level difference (ILD) 703 is an interaural level difference (ILD) of the extended information for decoding the input signal 701.

The separating circuit 709 includes the uncorrelating circuit 704, and the gain controlling circuits 705 and 706.

The uncorrelating circuit 704 uncorrelates the input signal 701 with the use of the correlation value 702 to generate two or more uncorrelated intermediate signals.

Each of the gain controlling circuit 705 and 706 uses the interaural level difference (ILD) 703 to adjust the gain of each of generated intermediate signals. The gain controlling circuits 705 and 706 perform the adjustment to generate the separated signals 707 and 708 which are separated from the input signal 701.

FIG. 7 illustrates a structure of the decoding unit A.

The decoding unit A includes separating circuits 603 and 604. The separating circuit 709 in FIG. 8 is an example of the separating circuits 603 and 604.

The separating circuits 603 and 604 perform decoding of the coded information more than once to decode the DMX signal of each transmission point (the DMX signals 201 and 204) out of the DMX signal 601 in the coded information 107 (FIG. 5) received at the reception point (the point 3). Accordingly, the plural acoustic signals picked up at each point are decoded.

Figure 22:
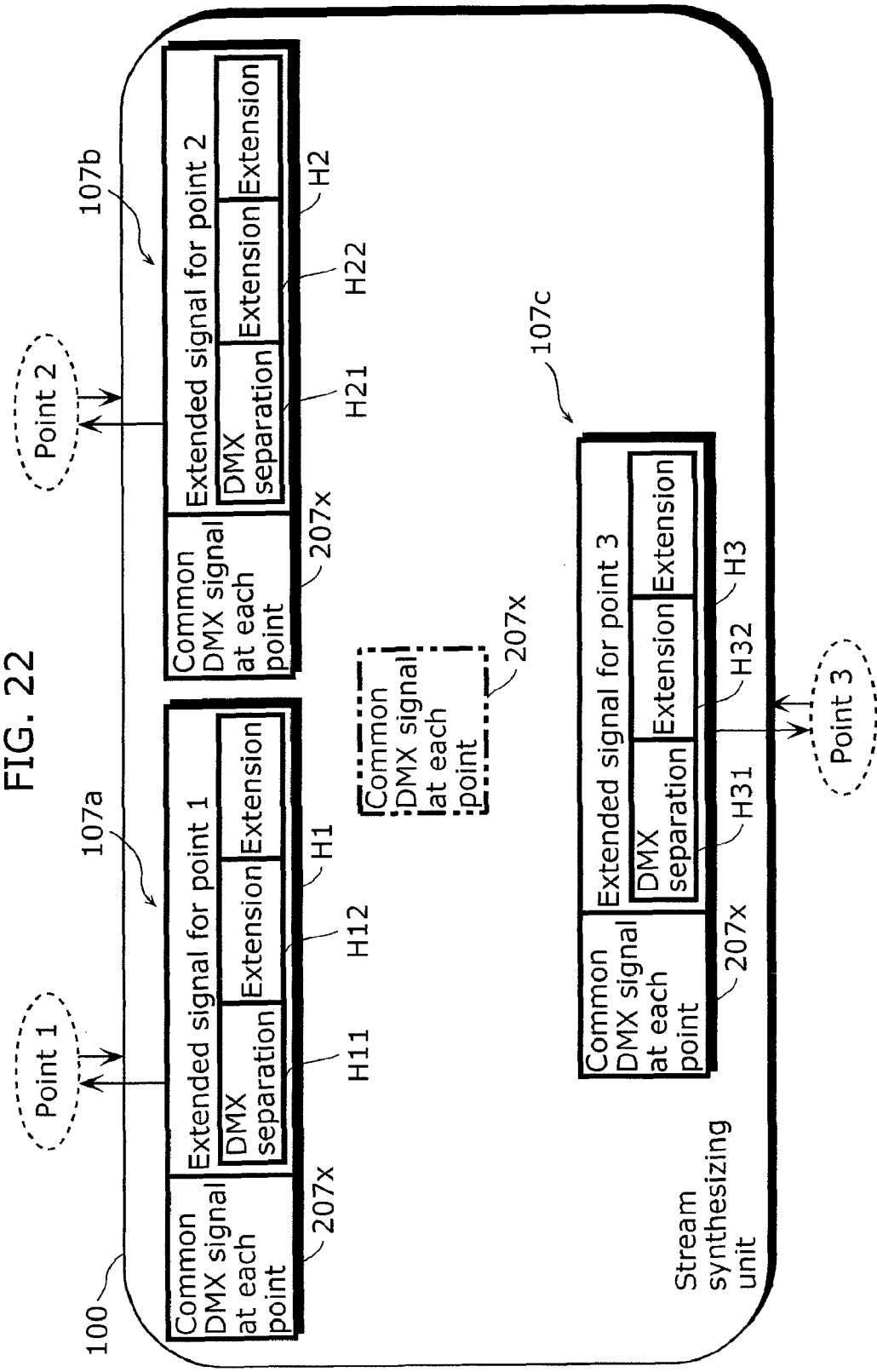
FIG. 22 is a diagram showing a process of the stream synthesizing unit transmitting each piece of coded information to an associated point.

It is noted that the system 1 may be structured as shown in FIG. 22.

FIG. 22 illustrates a process of the stream synthesizing unit 100 transmitting the coded information to each of the points 1 to 3.

FIG. 22 shows that each of the functional blocks in the stream synthesizing unit 100 (FIG. 4) performs the following operation.

The input unit I1 (FIG. 4) provides piece of the coded information (not shown) from the points 1 to 3 to the stream synthesizing unit 100. It is noted that the coded information provided from the point n (n=1, 2, and 3) is referred to as inputted coded information of the point n. Furthermore, a DMX signal included in the inputted coded information of the point n is referred to as an inputted DMX signal of point n. Moreover, the extended information included in the inputted coded information of the point n is referred to as inputted extended information of the point n.

An output unit I2 outputs the pieces of coded information (coded information to be outputted 107a, coded information to be outputted 107b, and coded information to be outputted 107c: FIG. 22) to each of the points 1 to 3. It is noted that the coded information to be outputted to the point n is referred to as coded information to be outputted to the point n.

Each of the coded information to be outputted 107a to 107c includes a common output DMX signal 207x as a DMX signal included in each of the coded information to be outputted. In other words, any content of the DMX signal included in the coded information to be outputted 107a to the 107c is the common output DMX signal 207x, and is the same each other. Then, each of the coded information to be outputted 107a to 107c includes, as the extended information, extended information to be outputted H1, extended information to be outputted H2, and extended information to be outputted H3, respectively. The pieces of extended information to be outputted H1 to H3 at each of the points are different each other.

The common outputted DMX signal 207x is a DMX signal with the associated inputted DMX signal at points 1 to 3 decoded. In other words, the common output DMX signal 207x is decoded into three inputted DMX signals; namely the inputted DMX signals at the points 1 to 3.

Next, the extended information to be outputted H1 at the point 1 shall be described out of each pieces of the extended information to be outputted (the extended information to be outputted H1 to H3).

The coded information to be outputted 107a forwarded to the point 1 includes, as the downmix separating information, downmix separating information H11 for separating a point in order to decode each of the inputted DMX signals at the associated point (the points 2 and 3) other than the point 1, the target point. Further, the coded information to be outputted 107a forwarded to the point 1 includes inputted extended information of the point 2 and inputted extended information of the point 3. In other words, the coded information to be outputted 107a includes each piece of the inputted extended information at the other associated point (the points 2 and 3). Hence, the extended information to be outputted H1 is extended information for decoding the acoustic signals of the other associated points (the points 2 and 3) out of the common output DMX signals 207x.

It is noted that the pieces of the extended information to be outputted (the extended information to be outputted H1 to H3), included in the coded information to be outputted of the point n, is referred to as extended information to be outputted of the point n.

Each piece of the extended information to be outputted H1 of the point 1 to the extended information to be outputted H3 of the point 3 has a configuration similar to the above-described extended information to be outputted H1 of the point 1.

In other words, each of the pieces of the extended information to be outputted of the points 1 to 3 (the extended information to be outputted H1, for example) includes: the inputted extended information (the inputted extended information of the point 2 and the inputted extended information of the point 3, for example) from each of the points (the points 2 and 3, for example) other than the point of the extended information to be outputted (the point 1, for example); and the downmix separating information (the downmix separating information H11, for example) for decoding the acoustic signal of each of the other points (the points 2 and 3, for example) out of the common DMX signal 207x.

A coded information to be outputted generating unit I3 (FIG. 4) generates each piece of the coded information to be outputted (the coded information to be outputted 107a to 107c) to the points 1 to 3 based on the associated piece of inputted coded information received by the stream synthesizing unit 100.

Specifically, the downmix shaping circuit 104 in the coded information to be outputted generating unit I3 generates the common output DMX signal 207x. In addition, the extended information calculating circuit 105 generates the extended information to be outputted H1 to H3. Then, the multiplexing circuit 106 generates the pieces of coded information to be outputted (the coded information to be outputted 107a to 107c) to each of the points based on the generated common output DMX signal 207x and the pieces of extended information to be outputted to H3.

The output unit I2 (FIG. 4) outputs each of the generated pieces of the coded information to be outputted (the coded information to be outputted 107a to 107c) to the associated point for the coded information to be outputted.

As described above, a stream synthesizing unit (the stream synthesizing unit 100) includes the input unit I1, the coded information to be outputted generating unit I3, and the output unit I2. Here, the input unit I1 inputs two or more of coded signals (inputted coded information) including: a first downmix acoustic signal (the inputted DMX signal) with an acoustic signal coded, the acoustic signal which has two or more downmixed sound signals; and the extended signal (inputted extended information) for obtaining the two or more of the sound signals from the first downmix acoustic signal. The coded information to be outputted generating unit I3 generates: a second downmix acoustic signal (the common output DMX signal 207x) for obtaining each of first downmix acoustic signals, and the extended signal (the downmix separating information H11) for obtaining each of the first downmix acoustic signals (the inputted DMX signals at the points 1 and 2) from the second downmix acoustic signal based on each of the coded signals (the inputted coded information at the point 1 and the inputted coded information at the point 2, for example) inputted by the input unit I2; and the coded signal (the coded information to be outputted 107a to be provided to the point 1) including the generated second downmix acoustic signal (the common output DMX signal 207x), the generated extended signal (the downmix separating information H11), and each of extended signals (extended information H12) included in the inputted associated coded signal. The output unit I12 outputs the generated coded signal.

In the stream synthesizing unit (the stream synthesizing unit 100), the input unit I1 inputs the coded signals (inputted coded information) from associated predetermined input-output destinations (the points 1 to 3), the output unit I2 outputs the coded signals (the coded information to be outputted) to the associated input-output destinations, and the coded information to be outputted generating unit I3 generates one of each second downmix acoustic signals described above (the common output DMX signal 207x) and as many of the extended signals (the extended information to be outputted H1, the extended information to be outputted H2, and the extended information to be outputted H3) as the number of the input-output destinations. The generated one second downmix acoustic signal is a downmix acoustic signal for obtaining each of the second downmix acoustic signals (each of the inputted DMX signals) included in the associated coded signal inputted from the corresponding input-output destination. The generated extended signals each (the extended information H1, for example): corresponds to the associated input-output destination (the point 1, for example) which is different each other; and only includes the extended signal (each piece of inputted extended information from the points 2 and 3) of the input-output destinations (the points 2 and 3) other than the corresponding input-output destination (the point 1). The output unit I2 outputs each of coded signals generated by the coded information to be outputted I3 to the input-output destination (the point 1) to which the extended signal (the extended information to be outputted H1, for example) included in the coded signal corresponds.

Then, the extended signal (the whole extended information 202 and extended information 203 in FIG. 5, for example) includes plural parts of extended signal (each piece of the extended information 202 and the extended information 203). In the stream synthesizing unit 100, the sound signal (signal 3) is obtained from the coded signal (the coded information 101), using some parts of the extended signal (the extended information 202), corresponding to a sound signal (the signal 3 at the point 1, for example), out of the plural parts of the extended signal.

The downmix shaping circuit 104 and the extended information calculating circuit 105 may process, at predetermined intervals such as 40 millisecond, the interval parts in the inputted coded information. Microphones at the point 1 may pick up acoustic signals from different users one another. The number of the users attending the meeting may vary, so may change the number of the picked up acoustic signals. The number of the acoustic signals may vary, the acoustic signals which the coded information (the coded information 101) forwarded to the stream synthesizing unit 100 downmixes.

Second Embodiment

Figure 9:
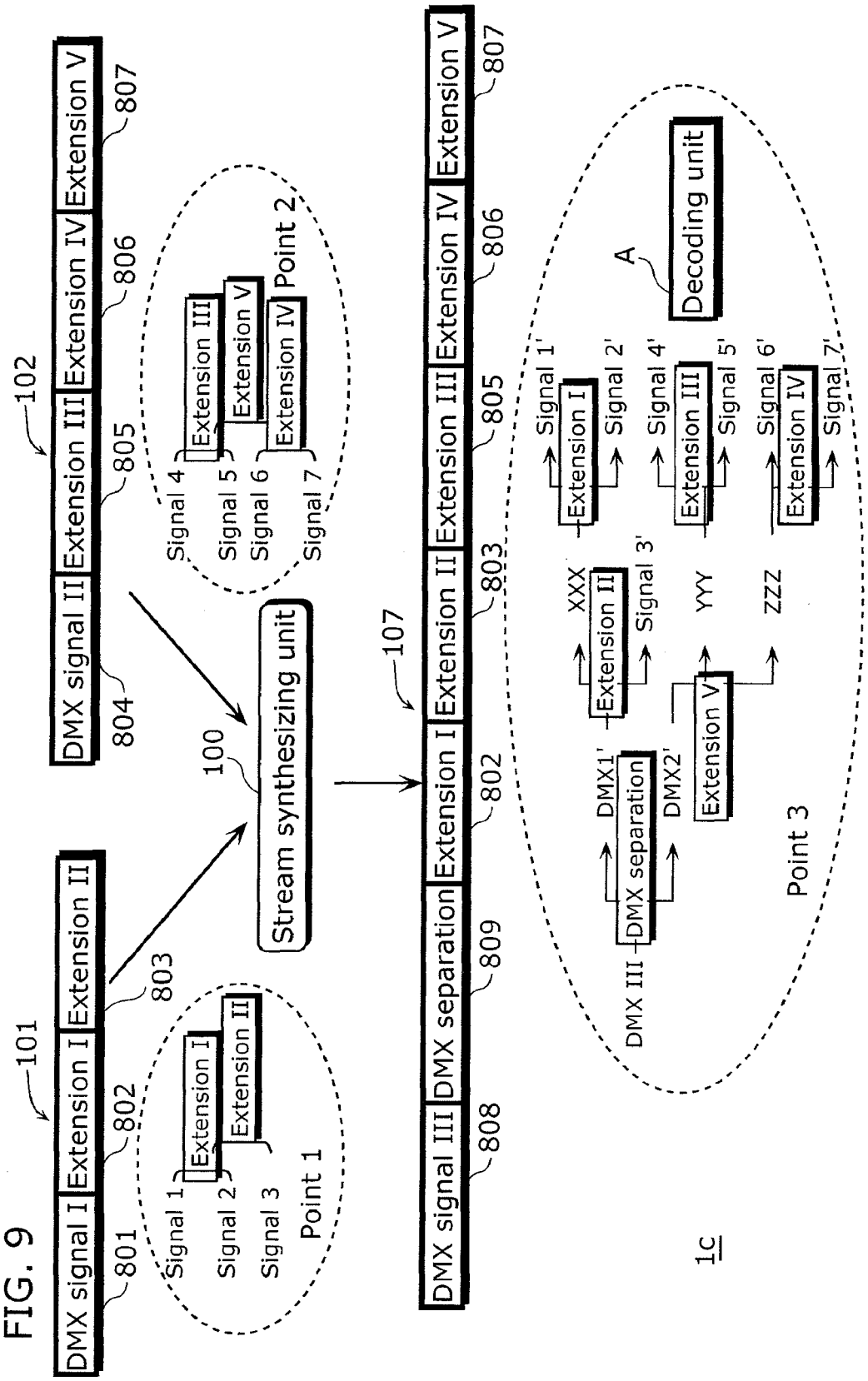
FIG. 9 exemplifies a multipoint connection in a second embodiment of the present invention.

FIG. 9 shows a system 1c including plural points establishing connections each other via the stream synthesizing unit 100 described in the first embodiment.

At the point 1, extended information 802 includes the signals 1 and 2, and extended signal 803 includes a downmix signal to which the signals 1 and 2 are downmixed and the signal 3. The details are described in the first embodiment. Similarly in the point 2, extended information 805 is calculated out of the signals 4 and 5, extended information 806 out of the signals 6 and 7, and extended information 807 out of a downmix signal to which the signals 4 and 5 are downmixed and a downmix signal to which the signals 6 and 7 are downmixed. The extended information is similar to a coefficient of the OTT circuit in the MPEG-Surround technique. At each of the points, in addition, downmix coded signals 801 and 804 with inputted signals downmixed and coded in the MPEG-AAC format, are generated to be transmitted to the stream synthesizing unit 100 described in the first embodiment via a network.

The stream synthesizing unit 100 provides to coded information the processing described in the first embodiment, and transmits the coded information to the point 3 via the network.

Here, as extended information in the coded information 107 transmitted to the point 3, information is assigned to show from which point the coded information has been transmitted. The conventional technique does not transmit the information on a point after all, and thus cannot control to separately reproduce the points 1 and 2 when reproducing at the point 3. However, the second embodiment codes to forward the information, to the point 3, indicating from which point the coded information is transmitted as the coded information shown in the second embodiment. This makes possible control to separately reproduce the points 1 and 2 when decoding at the point 3. Reproducing a voice of each of the acoustic signals at the point 1 on a left speaker and a voice of each of the acoustic signals at the point 2 on a right speaker enables true-to-life reproduction, which facilitates communication between each of the points.

Figure 10:
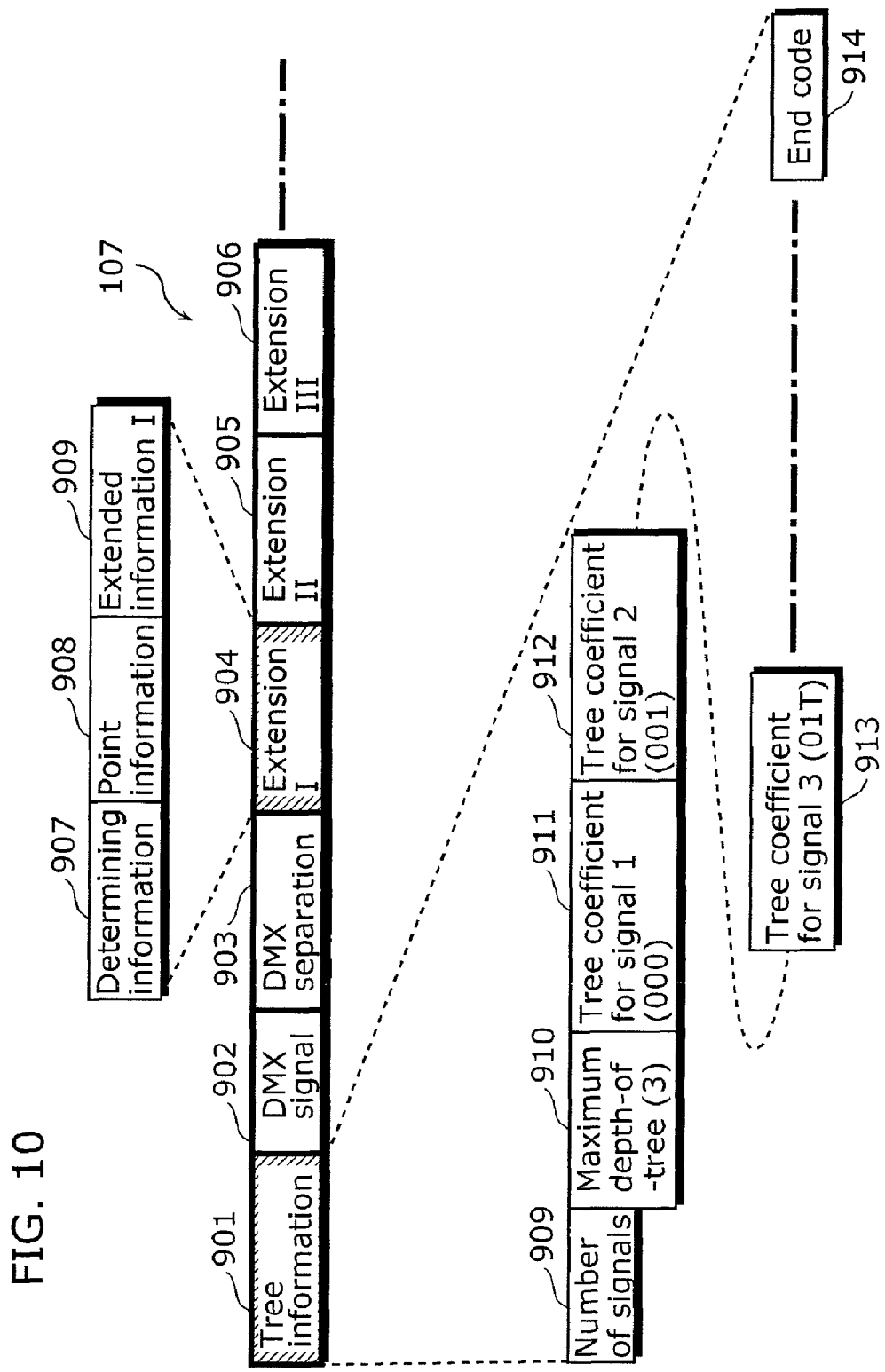
FIG. 10 exemplifies a coded stream in the second embodiment of the present invention.

FIG. 10 exemplifies a code string in the received coded information 107.

FIG. 10 shows an example when the coded information 107 includes point information 908. The coded information 107 in FIG. 10 includes the point information 908 in extended information 904.

First, information is assigned to the starting point of the coded information 107 to show following extended information. The information is tree information 901 in FIG. 10. The extended information, for separating a downmix signal, transmits information on how the separation is executed in the case where plural downmix signals are found. In FIG. 9, for example, the extended signal 802 transmits information to determine which signal is separated to be provided to which channel since the extended signal 802 holds an interaural level difference (ILD) and interaural correlation coefficients (ICC). As shown in FIG. 9, the signal 1 is generated by: separating a DMX signal 808 and a DMX separating (downmix separating information) 809 to provide a first channel; separating the provided first channel with the use of the extended information 803 to provide a first channel; and then separating the provided first channel with the use of the extended information 802 to provide a first channel as the signal 1. Similarly, the signal 2 is generated by: separating the DMX signal 808 and the DMX separating (downmix separating information) 809 to provide a first channel; separating the provided first channel with the use of the extended information 803 to provide a first channel; and then separating the provided first channel with the use of the extended information 802 to provide a second channel as the signal 2. The signal 3 is generated by separating the DMX signal 808 and the DMX separation (downmix separating information) 809 to provide a first channel, and then separating the provided first channel with the use of the extended information to provide a second channel as the signal 3. As described above, the extended signal 802 transmits information on the signal establishing a connection to which separating circuit and forwarded to which channel.

For example, the extended information 904 includes determining information 907 to identify the extended information 904 either as the extended information for separating the downmix coded signal or as the extended information for separating the signals on a point basis. Here, the extended information 904, separating the signals on a point basis (separating the signals 1 and 2), stores information on "separation on a point basis". Other than the above, the extended information 904 includes: point information 908 indicating from which point each piece of extended information is transmitted (here, indicating the point 1); and extended information 909 for separating the signals 1 and 2, such as the interaural level difference (ILD) and the interaural correlation coefficients (ICC). Similarly, extended information 905 includes extended information indicating: information in separation on a point basis; information on the point 1; and extended information for separating the signal 3 and the downmix signal to which the signals 1 and 2 are downmixed.

A DMX separating signal (downmix separating information) 903 includes information indicating that the extended information is for separating the downmix coded signal, and extended information for separating the downmix signals of the points 1 and 2.

Further, the lower half of the FIG. 10 shows a configuration of the tree information 901 (FIG. 10).

In addition to the above signals, the tree information 901 indicating a connection of a separating circuit is assigned to the coded information 107 to be transmitted. FIG. 10 shows the details. First, the total number of signals 909 is stored in the tree information 901. FIG. 9 shows that the point 3 receives seven signals; namely the signals 1 to 7, and thus the number of signals 909 stores "7". Next, the tree information 901 has maximum depth-of-tree 910 to show the "depth" of the separating circuits. FIG. 9 shows the point 3 establishing a three-stage connection between the separating circuits. Thus, the maximum depth-of-tree 910 stores "3" as the depth information. Then, the tree information 901 holds information on proceeding output channels for separating the signal 1 as a tree coefficient 911 for the signal 1. In order to separate the signal 1, the DMX signal 808 and the DMX separation (downmix separating information) 809 are separated to provide the first channel, and the provided first channel is further separated by the extended information 803 to provide the first channel, and the provided first channel is further separated with the use of the extended information 802 to provide the first channel. Thus, a coefficient having three-digit zeros is held Similarly, the channels are preceded from the first channel via the first channel to the second channel in order to separate the signal 2. Thus, "001" is held as a tree coefficient 912 for the signal 2. In the case of the signal 3, the channels are proceeded from the first channel to the second channel (ending here). Thus, information indicating "01" and end is held as a tree coefficient 913.

Storing the tree information as described above makes possible easy determination in the number of the separating circuits (the OTT circuit in the MPEG-Surround) in accordance with the number of separations based on a desired decoding result. This configuration allows the decoding unit A to predict a calculation amount, based on the tree information, of the separating circuit (the OTT circuit in the MPEG-Surround) before decoding calculation, which enables effective distribution of the calculation resources included in the decoding unit A. As a result, overall distribution of the calculation resources can be predicted in advance. Thus, calculation peak values can be easily diversified. The diversification of the calculation peak values means that the worst case of processor power required for decoding can be secured in advance, which is beneficial in implementing a low-frequency processor clock and designing an energy-saving decoding circuit. Besides, the distribution of the calculation resources improves reusability of a storage memory required for calculation. This possibly provides a beneficial effect in realizing a decoding LSI designed to save memory.

It is noted that FIG. 10 is shown as an example of the tree information 901; meanwhile, the order of the number of signals 909 and the maximum depth-of-tree 910 shall not be limited to that in FIG. 10. As a matter of course, the tree information 901 may easily be formed either: separately have the number of signals 909, various tree coefficients, or the depth-of-tree information 910; or store the combination thereof as FIG. 10 shows.

In addition, the embodiment shows the case of transmitting the number of signals and tree configuration information as coded information; meanwhile, the number of signals and the tree configuration information can be transmitted separately from the coded information. A technique of the separate transmission is to use initialization information to be transmitted and received when the points 1 to 3 establish connections and each of the coding apparatus and decoding unit establish communications. In the case where the number of points and a point number of each point do not dynamically change as the initialization information, transmitting the number of signals and tree configuration information when initializing the coding apparatus and decoding unit at each point improves coding efficiency of the coded information itself compared with transmitting the number of signals and tree configuration information included in each pieces of the coded information. This improves sound quality in the same transmission rate. In the case where the numbers of signals and points, the point number, and the number of input signals are not transmitted as the initialization information; that is the case where the pieces of information are transmitted as the coded information on a frame basis, connecting points can be dynamically changed on a frame basis. As a matter of course, the number of input signals can be changed on a frame basis. Hence, when utilizing the present invention in a communications system for transmitting and receiving input signals, at each point, assigned to associated speakers in order to enjoy a true-to-life atmosphere, the speakers can be dynamically switched, and thus attendants at the meeting can be flexibly changed depending on a situation.

Further, each of the input signals at the associated transmitting point (the points 1 and 2 in the embodiment) as described above is a signal picked up by the microphones. Meanwhile, a distance between the microphones and direction information on each microphone when picking up sounds can be included in the coded information to be transmitted as the point information. When the distance between each of the microphones and the direction information of each of the microphones are included in the coded information, the decoding unit receiving the coded information can omit decoding processing since the signals 1 and 3 can be forwarded as a single signal because a correlation between the signals 1 and 3 possibly becomes high in the case where, for example, the distance between a microphone picking up an input signal 1 and a microphone picking up an input signal 3 is short; namely, within 10 centimeter. The present invention, which can also be formed to save power, enjoys a flexible and beneficial structure for a system in which power conservation is essential, such as a teleconference system utilizing cellular phones and a small-size domestic communications tool providing a true-to-life atmosphere.

Third Embodiment

FIG. 11 illustrates the above described downmix shaping circuit 104*a*.

The downmix shaping circuit 104 is structured as FIG. 6 shows in the first embodiment. Meanwhile, FIG. 11 shows another embodiment. FIG. 11 exemplifies reception of the incoming downmix signals 201 and 204 coded on a conventional stereophonic coding technique, such as the MPEG-AAC and MP3.

As an example, the following describes the case where the downmix signals 201 and 204 are coded on the MPEG-AAC technique. As a matter of course, the coding technique may be the MP3 technique as well as a typical lossy stereophonic compression technique including the TwinVQ, and the MPEG-Layer2, instead of the MPEG-AAG technique. Moreover, the coding technique may be a lossless compression technique including the LPCM, the MPEG-ALS, and the MPEG-SLS.

Each of the downmix signals is coded on the MPEG-AAC technique. The decoding sequence is described in Non-Patent Reference 1. An outline of the decoding involves decoding the separated downmix signals in the PCM signals via each of an analysis of the coded information, inverse quantization, and time-frequency transform. The embodiment shall focus on a post-quantization process which is an essential point of the embodiment. Upon analyzing the coded information, each of the provided downmix signals 201 and 204 is inverse-quantized (Requantize) by the associated inverse quantizing unit 1001. A detailed process, described in Non-Patent Reference 1, is briefly shown below. The process uses Expression 8 (See the description in FIG. 11 of the first embodiment) to provide the spectrum information (Spec(n)). Here, QuantizeValue(n) is a quantized value obtained by downmixing, and Gain(n) is quantized Gain of the frame.

The inverse-quantized units perform inverse-quantization on the provided corresponding downmix signals 201 and 201 to obtain two pieces of spectral data (Spec201(n), and Spec204(n)). An adding unit 104aX adds these pieces of spectral data, using the above-described Expression 9, to obtain the synthesized spectrum Spec(n).

It is noted here that the coefficient is set to 0.5; however, the coefficient shall not be limited to 0.5. Any given coefficients for Spec201(n) and Spec204(n) shall be provided as far as a relationship similar to Expression 7 holds.

The synthesized spectrum obtained above is re-quantized by the quantizing unit 104aY, utilizing the MPEG-AAC technique. The resultant of the re-quantization is the downmix signal 207 included in the coded information 107 provided from the stream synthesizing unit 100.

The structure of the present invention performing inverse-quantization followed by addition means performing addition in frequency information. This eliminates the need for time-frequency transform (including the MDCT processing) required to restore the separated downmix coded signals to the PCM signals. This allows the stream synthesizing unit 100 to dispense with a high calculation performance of the processor. In other words, this can lower the maximum operating frequency of the processor and reduce a size of the calculation memory in proportion to less extra processing, which results in a significant effect in reducing production and designing costs.

It is noted that the downmix signal is on the MPEG-AAC technique in the embodiment; meanwhile, the technique shall not be limited to this. The technique may also be the MPEG-Layer3 and the TwinVQ, as well as any audio coding technique utilizing time-frequency transform.

Fourth Embodiment

Figure 12:
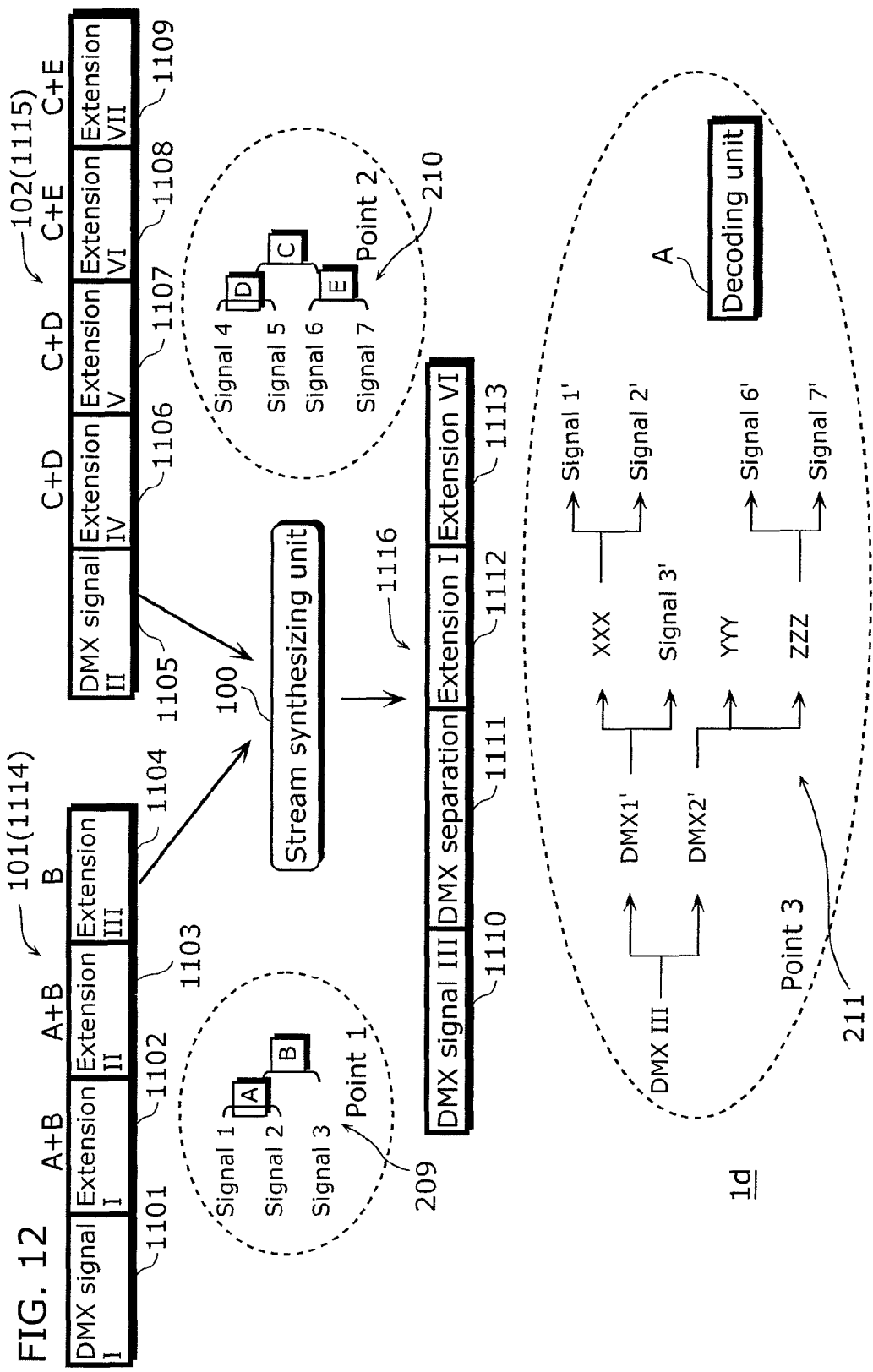
FIG. 12 exemplifies a multipoint connection in a fourth embodiment of the present invention.
Figure 13:
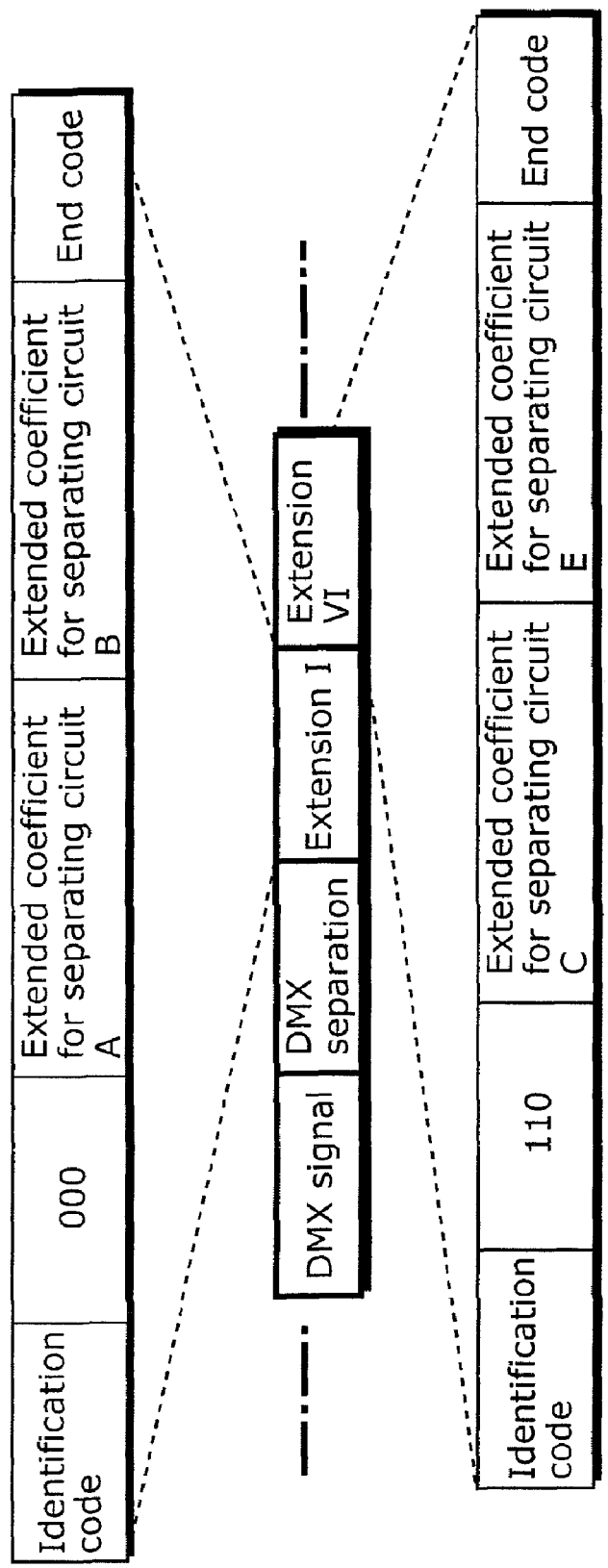
FIG. 13 exemplifies a coded stream in the fourth embodiment of the present invention.

FIG. 12 illustrates another embodiment of the stream synthesizing unit 100.

FIG. 12 shows a system 1d including the points 1, 2, and 3 establishing connections each other via the stream synthesizing unit (multipoint connection unit) 100 of the present invention. Each of the points uses a microphone to pick up two or more acoustic signals in order to obtain a multi-channel PCM signal. In FIG. 12, the signals 1, 2, and 3 and 4, 5, 6, and 7 are picked up at the points 1 and 2, respectively. As described in the first embodiment, a stereophonic or monophonic downmix PCM signal is calculated out of the obtained PCM signal.

The calculated stereophonic or monophonic downmix PCM signal receives stereophonic or monophonic acoustic coding processing. A stereophonic signal receives acoustic coding processing on the MPEG-AAC technique described in Non-Patent Reference 2. A monophonic signal receives monophonic coding processing, such as the G. 726 and the MPEG-AAC described in Non-Patent Reference 1. FIG. 12 shows signals, with each of downmix PCM signals coded, as DMX signals 1101 and 1105. These are referred to as downmix coded signals.

Next, a signal referred to as a extended signal is obtained. This signal is information for decoding the downmix signals (the DMX signals 1101 and 1105) in plural independent signals. The point 1 exemplifies the calculation of the extended signal. First, an interaural level difference (ILD) and a interaural correlation coefficient (ICC) are derived from between input signals (in the case where the signal 1 and signal 2 are both monophonic signals) on a frame basis as shown in the first embodiment.

The calculated interaural level difference (ILD) and interaural correlation coefficients (ICC) are quantized and Huffman-coded to create a coefficient A. The OTT circuit (a circuit generating the above extended signal out of two inputs) used for the MPEG-Surround coding described in Non-Patent Reference 3 shall provide a detailed process of the calculation. It is noted that the interaural level difference (ILD) and the interaural correlation coefficient (ICC) are exemplified as extended information; however, the extended information shall not be limited to these. Further, the above calculation has exemplified to generate the extended information out of two independent signals. When obtaining the extended information out of three signals; meanwhile, another technique is utilized. The TTT circuit used for the MPEG-Surround coding described in Non-Patent Reference 3 shall provide the details of the technique.

Next, the signals 1 and 2 are downmixed to be converted into the monophonic signal. The interaural level difference (ILD) and the interaural correlation coefficient (ICC) are calculated, using Expressions 2 and 3, out of the monophonic signal and the signal 3, and quantized and Huffman-coded to create a coefficient B. A signal tree 209 at the point 1 in FIG. 12 schematically illustrates the above.

The above is different from that in the first embodiment in that each the coefficients A and B calculated above is stored in a coded stream, as follows.

Extended information 1102, obtained by multiplying the coefficients A and B, represents "complete information required to separate the signal 1". Similarly, extended information 1103, obtained by multiplying the coefficients A and B, represents "complete information required to separate the signal 2. Extended information 1104 includes the coefficient B alone. Similar to the point 1, the point 2 has extended information 1106, extended information 1107, extended information 1108, and extended information 1109 including coefficients C and D, the coefficients C and D the coefficient C and a coefficient E, and the coefficients C and E; respectively.

The downmix coded signal and the extended information obtained above are synthesized into pieces of coded information 101 (1114), and 102 (1115) on a point basis to be transmitted from the transmitting points (the points 1 and 2) to the stream synthesizing unit 100 via a communications path, such as the Internet.

The stream synthesizing unit 100 in the present invention executes processing similar to the first embodiment. Specifically, each of the separating circuits 103 (FIG. 4) separates the downmix coded signals and the extended information from the coded information 101 at the point 1 and the coded information 102 at the point 2. In the separation, a piece of information to distinguish between the downmix coded signals and the pieces of extended information are assigned to each starting point of the piece of extended information. The separating circuit 103 executes the above separation in accordance with the piece of information.

The separated downmix coded signals are temporarily decoded in the PCM signals, following a predetermined process. It is noted that this processing sequence depends which coding technique is used for coding the downmix signals. As an example, the coding technique in the MPEG-AAC means that the processing sequence is the one described in Non-Patent Reference 2. The PCM signals obtained above are referred to as the PCM 1 and PCM 2. The decoded PCM signals are further downmixed by the downmix shaping circuit 104 and coded in a predetermined coding standard (the MPEG-AAC standard, for example) to generate the downmix coded signal 207. Expression 4 (refer to FIG. 4 in the first embodiment) exemplifies a downmixing process described above. This process is equivalent to an operation of the downmixing circuit 503.

Next, the extended information calculating circuit 105 calculates extended information out of the PCM 1 and the PCM 2 in accordance with the above described Expressions 2 and 3 (see the description in FIG. 5 of the first embodiment). This calculated extended information is referred to as the downmix separating information 208. The OTT circuit used for the MPEG-Surround described shall provide a detailed process of the calculation.

Here, the downmix separating information 208 is derived from the PCM 1 and PCM 2 because of the following reasons. Further downmixing the downmix coded signals at the points 1 and 2, possibly having totally different acoustic characteristics, eliminates characteristics which the downmix coded signals have originally had. The eliminated acoustic characteristics cannot be recovered despite extending the signals with the acoustic characteristics eliminated. Thus, the coded information with the extended information of the downmix coded signal assigned is configured in order to retain the acoustic characteristics without increasing an information amount as possible.

The downmix coded signal 207 as described above, the downmix separating information 208, and the extended information 202, 203, 204, and 205 all of which is included in the coded information 101 and 102 are multiplexed by the multiplexing circuit 106, and transmitted to the point 3, as the coded information 107.

Next, the decoding unit A having received the downmix coded signal and the extended information shall be described below. The decoding unit A first separates the downmix signal and the extended signal, and then decodes the downmix coded signal on a predetermined decoding circuit. The process described in Non-Patent Reference 2 is adopted when the MPEG-AAC technique is utilized. Based on the decoded PCM signal obtained through the decoding and the aforementioned separated extended information, independent plural acoustic signals are decoded. FIGS. 7 and 8 show an example of the decoding circuit.

Citing the point 3 as an example, the decoding unit A in FIG. 7, including a separating circuits 603 and 604 connected in multistage, receives the downmix signal 601 and the extended signal 602 both obtained as PCM signals. The OTT circuit and the TTT circuit of the MPEG-Surround disclosed in Non-Patent Reference 3 are exemplified as a separating circuit. FIG. 8 exemplifies a simple separating circuit.

Based on: the input signal 701, the interaural level difference (ILD. Referred to as the separating information (interaural level difference) 703 in FIG. 8) described in Expressions 2 and 3 (see the description of FIG. 8 in the first embodiment); and the interaural correlation coefficients (ICC. Referred to as the separating information (correlation value) 702 in FIG. 8), the decoding unit A first causes an uncorrelating circuit 704 to uncorrelate the input signal 701. The Decorrelator circuit in Non-Patent Reference 3 executes the above operation. The uncorrelation by uncorrelating circuit 704 shall not be limited to this. Non-Patent Reference 6, for example, discloses a technique to uncorrelate the signal, utilizing the Levinson-Durbin algorithm.

The input signal 701 travels through the uncorrelating circuit 704 and has the gain controlled by gain controlling circuits 705 and 706. Then, separated signals 707 and 708 are obtained. Based on the interaural level difference (ILD) 703, the gain controlling circuits 705 and 706 use previously described Expressions 6 and 7 (see description of FIG. 8 in the first embodiment) to execute the calculations.

Here, the Dec operator in Expressions 6 and 7 denotes uncorrelation of the signal, and Sig1 and Sig2 denote the separated signals 707 and 708. A sequence of the processing described above enables desired independent plural monophonic or stereophonic signals to be decoded out of the downmix extended coded signal (the downmix separating information).

It is noted that a coding apparatus and a decoding unit, utilizing the MPEG-Surround technique, described in Non-Patent Reference 3 may be used in processes to calculate the extended information and to decode the originally independent signals out of the downmix signal and the extended information both obtained as the PCM signals. Moreover, the coding technique used in the processes shall not be limited to the MPEG-Surround technique; instead, the MP3 surround technique as well as uncompressed coding technique including the LPCM technique can be adopted, as a matter of course.

The stream synthesizing unit 100 (MCU) implemented above is an exemplary embodiment of the present invention, and shall not be limited to this. Further, the represented number of points to forward the coded information is two. The number, however, shall not be limited to two. Three or more of the points shall be adopted.

As shown in FIG. 12, the coded information 101 at the point 1 includes the DMX signal 1101, the extended information 1102 for separating the signal 1, the extended information 1103 for separating the signal 2, and the extended information 1104 for separating the signal 3. Each of the signals 1 to 3 is separated based on the DMX signal. Pieces of the extended information 1102 and the extended information 1103 include coded separation coefficients A and B, respectively. The extended information 1104 includes separating information B required for separating the signal 3 from the DMX signal 1101. Similarly, the coded information 102 at the point 2 includes the DMX signal 1105, the extended information 1106 for separating the signal 4, the extended information 1107 for separating the signal 5, the extended information 1108 for separating the signal 6, and the extended information 1109 for separating the signal 7. Each of the signals 4 to 7 is separated based on the DMX signal 1105. The extended information 1106 and the extended information 1107 includes both of coded separating information C and coded separating information D. The extended information 1108 and the extended information 1109 includes both of the separating information C and separating information E required for separating signals 6 and 7 from the DMX signal 1105.

The coded information configured above is synthesized in the coded information 1116 (FIG. 12) at the stream synthesizing unit 100 in the embodiment and transmitted to the point 3. Here, the DMX signals 1101 and 1105 are synthesized to obtain a new DMX signal 1110. The first embodiment provides details of the calculation process. As a matter of course, the DMX signals 1101 and 1105, each most likely having different acoustic characteristics, are not simply synthesized to be downmixed. Instead, a DMX extended signal (the downmix separating information) 1111 for separating the DMX signals 1101 and 1105 from the synthesized signal (the DMX signal 1110) shall be calculated to be assigned to the coded information 1116. The coded information 1114 and the coded information 1115 is configured above. Then, the stream synthesizing unit 100 transmits the coded information 1116 to the point 3. Here, the coded information 1116 is synthesized out of: the extended information 1102 as the extended information 1112; and the extended information 1108 as the extended information 1113, respectively. The point 3 which receives the coded information 1116 can decode the signals 1 and 6 alone. In other words, the DMX extended information (the downmix separating information) 1111 separates the DMX signal 1110 into a DMX 1' signal and a DMX 2'. Separating each of the separated signals with the use of the separation coefficient B included in the extended information 1112 (=1102) enables separating the signal 3 and a signal synthesized out of the signals 1 and 2. Further, separating the synthesized signal out of the signals 1 and 2 with the use of the separation coefficient A included in the extended information 1112 (=1102) provides the signal 1. Similarly, the DMX'2 can be separated into a synthesized signal out of the signals 4 and 5 and a synthesized signal out of the signals 6 and 7 with the use of the separation coefficient C included in the extended information 1113 (=1108). Separating the synthesized signal out of the signals 6 and 7 with the separation coefficient E included in the extended information 1113 (=1108) provides the signal 6.

Since the above is an example, another input signal having a different combination may also be transmitted. The stream synthesizing unit can synthesize a combination of the extended information 1104 and the extended information 1107 to configure coded information 1116 in order to transmit the input signals 3 and 5.

The configurations of the coded information 1114 and the coded information 1115 in FIG. 12 make possible a stream synthesizing unit which can choose some needed transmission channels (input channels) of each point. This configuration allows the stream synthesizing unit to freely generate the coded information 1116 having various combinations of input signals on a point basis and an input signal basis. In addition, the stream synthesizing unit can curb increase in information transmission amount (bit rate) by transmitting some of the coded information 1114 and the coded information 1115, not all. In the case of FIG. 12 (two transmission points and seven signals), a simple calculation requires 22 different pieces of coded information which must be all transmitted. This results in an increase in bit rate. Simple transmission of the 22 different pieces of the coded information amounts to as much as approximately 1.4 Mbps for 22 channels, providing that the bit rate is 64 kbps per a channel in the MPEG-AAC technique, for example. The present invention, however, requires the transmission rate for as few as seven pieces of the extended information even when the number of transmission signals is seven at maximum since the stream synthesizing unit simply chooses the seven pieces of the extended information. Each piece of the extended information is as much as several kbps at most. Thus, transmitting seven pieces ends in approximately 30 kbs. As shown in FIG. 12, two signals amounts to approximately 64 kbps of the DMX coded part at most, which enables transmission with less than 100 kbps in the entire coded information 1116. In terms of industrial applicability, the present invention is significantly beneficial so that a low bit rate and flexible point establishment and transmission configuration can be realized.

Hence, each of the following stream synthesizing units (A1) to (A11) and a decoding unit (B) is constructed.

In other words, formed is a stream synthesizing device (A1) including: an input unit (the input unit I1) which inputs at least two coded signals (the coded information 101 and the coded information 102) each including a first downmix acoustic signal (the DMX signal 201 and the DMX signal 204 in FIG. 5) and an extended signal (the extended information 202, the extended information 203, the extended information 205, and the extended information 206), each of first downmix acoustic signals being obtained by coding an acoustic signal (the downmix PCM signal) into which at least two sound signals (speech signals) picked up by microphones are downmixed, and the extended signal being for obtaining the at least two sound signals (each of speech signals at point 1 and each of speech signals at point 2) out of the first downmix acoustic signal; a coded signal generating unit (the coded information to be outputted generating unit I3) which generates: a second downmix acoustic signal (the DMX signal 207) and an extended signal (the downmix separating unit 208) based on each of coded signals inputted by the input unit, the second downmix acoustic signal being for obtaining each of the first downmix acoustic signals (the DMX signal 201 and the DMX signal 204), and the generated extended signal being for obtaining each of the first downmix acoustic signals (the DMX signal 201, the DMX signal 204) out of the second downmix acoustic signal; and generates a coded signal (the coded information 107) including the generated second downmix acoustic signal (the DMX signal 207), the generated extended signal (the downmix separating information 208), and each of extended signals (the extended information 202 and the extended information 203 at the point 1, and the extended information 205 and the extended information 206 at the point 2) included in the corresponding inputted coded signal; and an output unit (the output unit I2) which outputs the generated coded signal.

The structure of the stream synthesizing device (A1) makes possible transmitting and receiving each of the sound signals in the associated coded signal to be inputted, using simple processing, eliminating the need for processing in a large processing amount, such as decoding each sound signal out of the associated coded signal to be inputted, and coding the decoded sound signal into a coded signal to be outputted.

Further, the stream synthesizing device (A2) includes the coded signal generating unit (the coded information to be outputted generating unit I3) which calculates an aggregate number (the number of signals 909 in FIG. 9) of the at least two sound signals included in each of the coded signals inputted by said input unit, and the coded signal to be generated (the coded information 107) includes the calculated aggregate number of the at least two sound signals (A1).

Moreover, the stream synthesizing device (A3) features that the extended signal (all of Extension I (the extended information 202) to Extension II (the extended information 203) in FIG. 5, for example) in the coded signal inputted by said input unit includes a plurality of partly extended signals (Extension I and Extension II), and some of the plurality of partly extended signals (Extension I) obtain a sound signal (the signal 3 at the point 1 in FIG. 5, for example) out of a coded signal (the coded information 101), the some of the plurality of partly extended signals which are included in the plurality of partly extended signals being corresponding to the sound signal (the sound signal 3), and the coded signal generating unit (the coded information to be outputted generating unit I3) generates the coded signal (A1) storing the some of the plurality of partly extended signals (Extension I) corresponding to the sound signal (the signal 3 at the point 1, for example) being each of the at least two sound signals.

Further, the stream synthesizing device (A4) is formed to include the coded signal generating unit which generates the coded signal (A3) including only a partly extended signal for obtaining a predetermined acoustic signal out of each of the speech signals at the associated point.

Moreover, the stream synthesizing device is structured to include the coded signal generating unit generating (A1) the coded signal including only extended signals in some of predetermined coded signals, at some points, included in the at least two coded signals, at the corresponding points, each being inputted by the input unit.

In addition, the stream synthesizing device (A6) is structured to include the coded signal generating unit which generates (A5) the coded signal only including an extended signal included in a coded signal inputted from an input source having a predetermined priority order higher than a predetermined reference order The stream synthesizing device (A7) features that the extended signal in the coded signal inputted by the input unit includes a plurality of partly extended signals, and a sound signal is obtained out of a coded signal with a use of some of the plurality of partly extended signals, included in the plurality of partly extended signals, corresponding to the sound signal, and the coded signal generating unit generates (A1) the coded signal only including the some of the plurality of partly extended signals corresponding to a sound signal having a priority order higher than a predetermined reference order, the priority order being predetermined.

Moreover, the stream synthesizing device (A8) features that the extended signal in the coded signal inputted by the input unit includes a plurality of partly extended signals, and a sound signal is decoded from a coded signal with a use of some of the plurality of partly extended signals, included in the plurality of partly extended signals, corresponding to the sound signal, and the coded signal generating unit generates (A1) the coded signal including tree information (the tree information 901 in FIG. 10) specifying a tree structure constructed out of the extended signal and each of partly extended signals in the coded signal to be generated, the extended signal being generated by the coded signal generating unit.

Further, the stream synthesizing unit (A9) features that the coded signal generating unit generates (A1) the coded signal including determining information (the determining information 907 in FIG. 10) indicating the extended signal generated by the coded signal generating unit among the extended signal generated by the coded signal generating unit and each of the extended signals included in the associated one of at least two coded signals inputted by the input unit.

In addition, the stream synthesizing device (A10) features that each coded signal inputted by the input unit includes input source information (the point information 908 in FIG. 10) indicating an input source from which the coded signal has been inputted, and the coded signal generating unit: identifies each of coded signals including input source information indicating a predetermined input source, each of the coded signals being included in the inputted each of at least two coded signals; generates the second downmix acoustic signal and an extended signal, the second downmix acoustic signal obtaining each of the first downmix acoustic signals in one of the associated identified coded signals, and the extended signal being for the obtaining; and generates (A1) the coded signal including the generated second downmix acoustic signal, the generated extended signal, and each of extended signals in one of the associated and identified coded signals.

Moreover, the stream synthesizing device (A11) features that the coded signal generating unit (the coded information to be outputted generating unit I3) includes (A1): a separating unit (the plural separating circuits 103 in FIG. 4) which separate the first downmix acoustic signal, included in each of the coded signals, from the coded signal inputted by the input unit; a downmix acoustic signal generating unit (the downmix shaping circuit 104) which generates the second downmix acoustic signal based on each of the first downmix acoustic signals separated by the separating unit; an extended signal generating unit (the extended information calculating circuit 105) which generates the extended signal based on each of the first downmix acoustic signals separated by the separating unit, the extended signal being for obtaining each of the first downmix acoustic signals out of the second downmix acoustic signal; and a synthesizing unit (the multiplexing circuit 106) which synthesizes, for generating the coded signal, the second downmix acoustic signal generated by the downmix acoustic signal generating unit, the extended signal generated by the extended signal generating unit, and each of the extended signals included in associated one of the coded signal inputted by the input unit (A11).

Moreover, a decoding device (the decoding device A) includes (B) an input unit (not shown) which inputs a coded signal (the coded information 107 in FIG. 5) including a downmix acoustic signal and an extended signal, the downmix acoustic signal being provided out of a coded acoustic signal into which at least two sound signals are downmixed, and the extended signal being for obtaining the at least two sound signals out of the downmix acoustic signal, wherein the downmix acoustic signal (the DMX signal 207) in the coded signal to be inputted is a second downmix acoustic signal for obtaining each of downmix acoustic signals (the DMX signal 201 and the DMX signal 204) in predetermined at least two coded signals (the coded information 101 and the coded information 102), the extended signal in the coded signal to be inputted is an extended signal (the downmix separating information 208) for obtaining each of the first downmix acoustic signals (the DMX signal 201 and the DMX signal 204) out of the second downmix acoustic signal (the DMX signal 207), and the decoding unit includes a decoding sub-unit (the separating circuit 709) which generates at least two intermediate signals (the two intermediate signals generated by the uncorrelating circuit 704 in FIG. 8) based at least on a interaural correlation coefficient (ICC) and a frequency interaural level difference (ILD) included in the extended signal (the downmix separating information 208), and to multiply the generated at least two intermediate signals by the frequency interaural level difference (ILD), the at least two intermediate signals being uncorrelated out of a decoded signal (the input signal 701 in FIG. 8) obtained from the second downmix acoustic signal with a use of the interaural correlation coefficient (ICC).

The Other Modification Examples

The above embodiments have described the present invention; meanwhile, the present invention shall not be limited to the above embodiments, as a matter of course. The following cases shall be included in the present invention.

(1) Specifically, each of the stream synthesizing units and the decoding unit is a computer system including a micro processor, a ROM, a RAM, a hard-disk unit, a display unit, a keyboard, and a mouse. The RAM or the hard-disk unit stores a computer program. The microprocessor operates on the computer program, which causes each of the units to implement a function thereof. Here, the computer program includes a combination of plural instruction codes sending an instruction to the computer in order to achieve a predetermined function.

(2) Some or all of the structural elements included in each of the above units may be included in a single system LSI (Large Scale Integration). A system LSI, an ultra-multifunction LSI, is manufactured with plural structural units integrated on a single chip. Specifically, the system LSI is a computer system having a micro processor, a ROM, and a RAM. The RAM stores a computer program. The system LSI achieves the function thereof by the micro processor operating on the computer program.

(3) Some or all of the structural elements having each of the above described units may be included in an IC card or a single module detachable to and from each of the units. The IC card or the module is a computer system which consists of a micro processor, a ROM, and a RAM. The IC card and the module may also include the above described ultra-multifunction LSI. The micro processor operates on the computer program, which allows the IC card and the module to achieve the function thereof. The IC card and the module may also be tamper-resistant.

(4) The present invention may be in methods described above. The present invention may also be a computer program executing the methods by a computer and a digital signal including the computer program.

The present invention may further include a computer-readable recording medium which stores the computer program or the digital signal into a flexible disk, a hard disk, a CD-ROM, an MO, a DVD, a DVD-ROM, a DVD-RAM, a BD (Blu-ray Disc) and a semi-conductor memory.

The present invention may further transmit the computer program or the digital signal via a network and data broadcast mainly including an electronic communications line, a wireless or a wired communications line and the Internet.

The present invention may also be a computer system including a micro processor and a memory. The memory may record the computer program described above, and the micro processor may operate on the computer program.

The present invention can be implemented by another independent computer system by storing to transfer the program or the digital signal in a recording medium or via a network.

(5) The present invention may be a combination of the above embodiment with any of the above modification example.

INDUSTRIAL APPLICABILITY

The present invention, establishing connections between plural points via a communications path, is effective for a multipoint teleconferencing system of which each of points is subject to multi-channel coding.

The above described stream synthesizing unit can provide an enhanced true-to-life atmosphere enjoyed in multipoint connecting, and reduce a calculation load at a multipoint connection unit, as well

The invention claimed is:

1. A stream synthesizing device which connects a plurality of input-output destinations, the stream synthesizing device comprising:
    an input unit configured to input, from the plurality of input-output destinations, at least two coded signals, each of the at least two coded signals including (i) a first downmix acoustic signal obtained by coding an acoustic signal into which at least two sound signals are downmixed and (ii) an extended signal for obtaining the at least two sound signals out of the first downmix acoustic signal;
    a coded signal generating unit configured to
        (i) generate, based on each of the at least two coded signals input by said input unit, (a) a second downmix acoustic signal for obtaining each of the first downmix acoustic signals included in the at least two coded signals inputted by said input unit and (b) an extended signal for obtaining each of the first downmix acoustic signals included in the at least two coded signals inputted by said input unit out of the second downmix acoustic signal, and
        (ii) generate a coded signal including fa) the generated second downmix acoustic signal, (b) the generated extended signal, and (c) each of the extended signals included in the at least two coded signals input by said input unit; and
    an output unit configured to output the generated coded signal to the plurality of input-output destinations,
    wherein said coded signal generating unit is configured to calculate an aggregate number of the at least two sound signals included in each of the at least two coded signals inputted by said input unit, and to include the calculated aggregate number in the coded signal to be generated.

2. The stream synthesizing device according to claim 1, wherein the extended signal in one of the at least two coded signals inputted by said input unit includes a plurality of partly extended signals, and some of the plurality of partly extended signals obtain a sound signal out of a coded signal, the some of the plurality of partly extended signals, which are included in the plurality of partly extended signals, corresponding to the sound signal, and
wherein said coded signal generating unit is configured to generate the coded signal so as to store the some of the plurality of partly extended signals corresponding to each of the at least two sound signals included in the one of the at least two coded signals.

3. The stream synthesizing device according to claim 2, wherein said coded signal generating unit is configured to generate the coded signal so as to include only a partly extended signal for obtaining a predetermined acoustic signal.

4. The stream synthesizing device according to claim 1, wherein said coded signal generating unit is configured to generate the coded signal so as to include only extended signals in some of predetermined coded signals included in the at least two coded signals inputted by said input unit.

5. The stream synthesizing device according to claim 4, wherein said coded signal generating unit is configured to generate the coded signal so as to include only an extended signal included in a coded signal inputted from an input source having a predetermined priority order higher than a predetermined reference order.

6. The stream synthesizing device according to claim 1, wherein the extended signal in one of the at least two coded signals inputted by said input unit includes a plurality of partly extended signals, and a sound signal is obtained out of a coded signal with a use of some of the plurality of partly extended signals, included in the plurality of partly extended signals, corresponding to the sound signal, and
wherein said coded signal generating unit is configured to generate the coded signal to include only the some of the plurality of partly extended signals corresponding to a sound signal having a priority order higher than a predetermined reference order, the priority order being predetermined.

7. The stream synthesizing device according to claim 1, wherein the extended signal in one of the at least two coded signals inputted by said input unit includes a plurality of partly extended signals, and a sound signal is decoded from a coded signal with a use of some of the plurality of partly extended signals, included in the plurality of partly extended signals, corresponding to the sound signal, and wherein said coded signal generating unit is configured to generate the coded signal so as to include tree information specifying a tree structure constructed out of jthe extended signal generated by said coded signal generating unit and (ii) each of partly extended signals in the coded signal to be generated.

8. The stream synthesizing device according to claim 1, wherein said coded signal generating unit is configured to generate the coded signal to include determining information indicating the extended signal generated by said coded signal generating unit or the extended signal included in one or the at least two coded signals inputted by said input unit.

9. The stream synthesizing device according to claim 1, wherein each of the at least two coded signals inputted by said input unit includes input source information indicating an input source from which the coded signal has been inputted, and wherein said coded signal generating unit is configured to:
  (i) identify coded signals, included in the at least two coded signals inputted by said input unit, including input source information indicating a predetermined input source;
  (ii) generate (a) the second downmix acoustic signal so that the second downmix acoustic signal is for obtaining the first downmix acoustic signal in one of the identified coded signals and (b) an extended signal for obtaining the first downmix acoustic signal in the one of the identified coded signals; and
  (iii) generate the coded signal so as to include (a) the generated second downmix acoustic signal for obtaining the first downmix acoustic signal in the one of the identified coded signals, (b) the generated extended signal for obtaining the first downmix acoustic signal in the one of the identified coded signals, and cc) the extended signal in the one of the identified coded signal.

10. The stream synthesizing device according to claim 1, wherein said input unit is configured to receive a coded signal from each of a plurality of predetermined input-output destinations, wherein said output unit is configured to output the coded signal to each of the plurality of input-output destinations, wherein said coded signal generating unit is configured to generate the second downmix acoustic signal and as many of the extended signals as the number of the plurality of input-output destinations, the second downmix acoustic signal to be generated being generated as a downmix acoustic signal for obtaining the first downmix acoustic signal included in a corresponding coded signal inputted from one of the plurality of predetermined input-output destinations, and each of the extended signals to be generated (i) corresponds to a different one of the plurality of input-output destinations and (ii) includes only an extended signal of an input-output destination other than the corresponding input-output destination, and wherein said output unit is configured to output each of the coded signals which said coded signal generating unit generates to the associated one of the input-output destinations to which the extended signal included in each of the coded signals corresponds, the extended signal being generated by said coded signal generating unit.

11. The stream synthesizing device according to claim 1, wherein said coded signal generating unit includes:
  a separating unit configured to separate the first downmix acoustic signal, included in each of the at least two coded signals, from the coded signal inputted by said input unit;
  a downmix acoustic signal generating unit configured to generate the second downmix acoustic signal based on each of the first downmix acoustic signals separated by said separating unit;
  an extended signal generating unit configured to generate the extended signal based on each of the first downmix acoustic signals separated by said separating unit, the extended signal being for obtaining each of the first downmix acoustic signals included in the at least coded signals inputted by said input unit out of the second downmix acoustic signal; and
  a synthesizing unit configured to synthesize, for generating the coded signal, (a) the second downmix acoustic signal generated by said downmix acoustic signal generating unit, (b) the extended signal generated by said extended signal generating unit, and (c) each of the extended signals included in the at least two coded signals inputted by said input unit.

12. A decoding device which is connected to a plurality of input-output destinations, said decoding device comprising
  an input unit configured to input a coded signal including a downmix acoustic signal and an extended signal, the downmix acoustic signal being obtained by coding an acoustic signal into which at least two sound signals are downmixed, and the extended signal being for obtaining the at least two sound signals out of the downmix acoustic signal, wherein the downmix acoustic signal in the coded signal to be inputted is a second downmix acoustic signal for obtaining each of first downmix acoustic signals in predetermined at least two coded signals from the plurality of input-output destinations, wherein the extended signal in the coded signal to be inputted is an extended signal for obtaining each of the first downmix acoustic signals out of the second downmix acoustic signal, wherein the coded signal to be inputted includes an aggregate number of sound signals that are downmixed to the first downmix acoustic signals, and wherein said decoding unit includes a decoding sub-unit configured to generate at least two intermediate signals based at least on an interaural correlation coefficient (ICC) and a frequency interaural level difference (ILD) included in the extended signal, and to multiply the generated at least two intermediate signals by the frequency interaural level difference (ILD), the at least two intermediate signals being uncorrelated out of a decoded signal obtained from the second downmix acoustic signal with a use of the interaural correlation coefficient (ICC).

13. A stream synthesizing method for connecting a plurality of input-output destinations, said system synthesizing method comprising:
  inputting, from the plurality of input-output destinations, at least two coded signals, each of the at least two coded signals including (i) a first downmix acoustic signal obtained by coding an acoustic signal into which at least two sound signals are downmixed and (ii) an extended signal for obtaining the at least two sound signals out of the first downmix acoustic signal;

generating, based on each of the at least two coded signals input by said input unit (i) a second downmix acoustic signal for obtaining each of the first downmix acoustic signals included in the at least two coded signals inputted by said input unit (ii) and an extended signal for obtaining each of the first downmix acoustic signals included in the at least two coded signals inputted by said input unit out of the second downmix acoustic signal; each of the first downmix acoustic signals, and the generated extended signal being for obtaining each of the first downmix acoustic signals out of the second downmix acoustic signal; and generating a coded signal including (i) the generated second downmix acoustic signal, (ii) the generated extended signal, and (iii) each of the extended signals included in the at least two coded signals input by said input unit; and outputting the generated coded signal to the plurality of input-output destinations, wherein said generating the coded signal includes calculating an aggregate number of the at least two sound signals included in each of the at least two coded signals inputted in said inputting, and including the calculated aggregate number in the coded signal to be generated.

14. A non-transitory computer-readable recording medium for use in a computer, said non-transitory computer readable recording medium having a computer program (i) to be used for executing processing for connecting a plurality of input-output destinations and (ii) recorded therein for causing the computer to execute a method comprising:

inputting, from the plurality of input-output destinations, at least two coded signals, each of the at least two coded signals including (i) a first downmix acoustic signal obtained by coding an acoustic signal into which at least two sound signals are downmixed and (ii) an extended signal for obtaining the at least two sound signals out of the first downmix acoustic signal;

generating, based on each of the at least two coded signals input by said input unit (i) a second downmix acoustic signal for obtaining each of the first downmix acoustic signals included in the at least two coded signals inputted by said input unit and (ii) an extended signal for obtaining each of the first downmix acoustic signals included in the at least two coded signals inputted by said input unit out of the second downmix acoustic signal; each of the first downmix acoustic signals, and the generated extended signal being for obtaining each of the first downmix acoustic signals out of the second downmix acoustic signal; and generating a coded signal including (i) the generated second downmix acoustic signal, (ii) the generated extended signal, and (iii) each of the extended signals included in the at least two coded signals input by said input unit; and outputting the generated coded signal to the plurality of input-output destinations, wherein said generating the coded signal includes calculating an aggregate number of the at least two sound signals included in each of the at least two coded signals inputted in said inputting, and including the calculated aggregate number in the coded signal to be generated.

15. A decoding method for connecting a plurality of input-output destinations, said decoding method comprising:

inputting a coded signal including a downmix acoustic signal and an extended signal, the downmix acoustic signal being provided out of a coded acoustic signal into which at least two sound signals are downmixed, and the extended signal being for obtaining the at least two sound signals out of the downmix acoustic signal, wherein the downmix acoustic signal in the coded signal to be inputted is a second downmix acoustic signal for obtaining each of first downmix acoustic signals in predetermined at least two coded signals from the plurality of input-output destinations, wherein the extended signal in the coded signal to be inputted is an extended signal for obtaining each of the first downmix acoustic signals out of the second downmix acoustic signal, wherein the coded signal to be inputted includes an aggregate number of the sound signals that are downmixed to the first downmix acoustic signals, and wherein said decoding method includes generating at least two intermediate signals based at least on an interaural correlation coefficient (ICC) and a frequency interaural level difference (ILD) included in the extended signal, and multiplying the generated at least two intermediate signals by the frequency interaural level difference (ILD), the at least two intermediate signals being uncorrelated out of a decoded signal obtained from the second downmix acoustic signal with a use of the interaural correlation coefficient (ICC).

16. A non-transitory computer-readable recording medium for use in a computer, said non-transitory computer readable recording medium having a computer program (i) to be used for executing processing for connecting a plurality of input-output destinations and (ii) recorded therein for causing the computer to execute a method comprising:

inputting a coded signal including a downmix acoustic signal and an extended signal, the downmix acoustic signal being provided out of a coded acoustic signal into which at least two sound signals are downmixed, and the extended signal being for obtaining the at least two sound signals out of the downmix acoustic signal, wherein the downmix acoustic signal in the coded signal to be inputted is a second downmix acoustic signal for obtaining each of first downmix acoustic signals in predetermined at least two coded signals from the plurality of input-output destinations, wherein the extended signal in the coded signal to be inputted is an extended signal for obtaining each of the first downmix acoustic signals out of the second downmix acoustic signal, wherein the coded signal to be inputted includes an aggregate number of the sound signals that are downmixed to the first downmix acoustic signals, and wherein said computer program causes the computer to execute generating at least two intermediate signals based at least on an interaural correlation coefficient (ICC) and a frequency interaural level difference (ILD) included in the extended signal, and multiplying the generated at least two intermediate signals by the frequency interaural level difference (ILD), the at least two intermediate signals being uncorrelated out of a decoded signal obtained from the second downmix acoustic signal with a use of the interaural correlation coefficient (ICC).

* * * * *